US012461458B2

(12) United States Patent
Shimozawa et al.

(10) Patent No.: US 12,461,458 B2
(45) Date of Patent: Nov. 4, 2025

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Hideharu Shimozawa, Tokyo (JP); Kaname Watariguchi, Kanagawa (JP); Kenichi Kaku, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 642 days.

(21) Appl. No.: 17/814,603

(22) Filed: Jul. 25, 2022

(65) Prior Publication Data

US 2023/0101167 A1 Mar. 30, 2023

(30) Foreign Application Priority Data

Aug. 6, 2021 (JP) ................................ 2021-130208

(51) Int. Cl.
*G03G 5/047* (2006.01)
*G03G 5/14* (2006.01)
*G03G 21/18* (2006.01)

(52) U.S. Cl.
CPC ............. *G03G 5/047* (2013.01); *G03G 5/144* (2013.01); *G03G 21/1814* (2013.01)

(58) Field of Classification Search
CPC ..... G03G 5/047; G03G 5/144; G03G 21/1814
See application file for complete search history.

(56) References Cited

U.S. PATENT DOCUMENTS

| | | | |
|---|---|---|---|
| 7,585,604 | B2 | 9/2009 | Ogaki |
| 7,910,274 | B2 | 3/2011 | Tanaka |
| 7,927,774 | B2 | 4/2011 | Ogaki |
| 8,783,209 | B2 | 7/2014 | Kaku |
| 8,841,052 | B2 | 9/2014 | Watariguchi |
| 8,974,991 | B2 | 3/2015 | Kawahara |
| 9,029,054 | B2 | 5/2015 | Okuda |

(Continued)

FOREIGN PATENT DOCUMENTS

| | | | |
|---|---|---|---|
| CN | 110133971 | A | 8/2019 |
| JP | 11-38709 | A | 2/1999 |

(Continued)

OTHER PUBLICATIONS

U.S. Appl. No. 17/812,227, Michiyo Sekiya, filed Jul. 13, 2022.

(Continued)

*Primary Examiner* — Mark F. Huff
*Assistant Examiner* — Boone Alexander Evans
(74) *Attorney, Agent, or Firm* — VENABLE LLP

(57) ABSTRACT

Provided is an electrophotographic photosensitive member including a support, an undercoat layer, a charge-generating layer, and a charge-transporting layer in the stated order, wherein with regard to an $S_0$, an $S_1$, an $S_2$, an $S_3$, and an $S_4$ determined by a specific procedure (A), a ratio $S_1/S_0$ is 0.34 or less, and one of the $S_2$, the $S_3$, or the $S_4$ is a positive value, and the other two thereof are negative values, or two thereof are positive values, and the other one thereof is a negative value.

7 Claims, 3 Drawing Sheets

(56) References Cited

U.S. PATENT DOCUMENTS

| | | | |
|---|---|---|---|
| 9,063,505 | B2 | 6/2015 | Sekiya |
| 9,068,083 | B2 | 6/2015 | Tanaka |
| 9,069,267 | B2 | 6/2015 | Kaku |
| 9,436,106 | B2 | 9/2016 | Kuno |
| 9,459,542 | B2 | 10/2016 | Tanaka |
| 9,500,966 | B2 | 11/2016 | Watariguchi |
| 9,535,347 | B2 | 1/2017 | Watariguchi |
| 9,563,139 | B2 | 2/2017 | Kawahara |
| 9,645,515 | B2 | 5/2017 | Kuno |
| 9,645,516 | B2 | 5/2017 | Kawahara |
| 9,869,032 | B2 | 1/2018 | Kawahara |
| 10,162,278 | B2 | 12/2018 | Kuno |
| 10,203,617 | B2 | 2/2019 | Kuno |
| 10,303,085 | B2 | 5/2019 | Sato |
| 10,539,892 | B2 | 1/2020 | Nishida |
| 10,558,132 | B2 | 2/2020 | Ishiduka |
| 10,558,133 | B2 | 2/2020 | Nakamura |
| 10,642,177 | B2 | 5/2020 | Nakamura |
| 10,691,033 | B2 | 6/2020 | Nishida |
| 10,747,130 | B2 | 8/2020 | Okuda |
| 10,747,131 | B2 | 8/2020 | Watanabe |
| 10,831,118 | B2 | 11/2020 | Watanabe |
| 10,838,315 | B2 | 11/2020 | Shimozawa |
| 11,003,102 | B2 | 5/2021 | Ishiduka |
| 11,112,719 | B2 | 9/2021 | Makisumi |
| 11,126,097 | B2 | 9/2021 | Ishida |
| 11,137,716 | B2 | 10/2021 | Hiyama |
| 11,181,837 | B2 | 11/2021 | Sekiya |
| 11,237,493 | B2 | 2/2022 | Makisumi |
| 11,249,407 | B2 | 2/2022 | Watariguchi |
| 11,256,186 | B2 | 2/2022 | Shimozawa |
| 11,340,553 | B2 | 5/2022 | Watariguchi |
| 11,366,402 | B2 | 6/2022 | Ishiduka |
| 11,392,050 | B2 | 7/2022 | Nishida |
| 2014/0004450 | A1 | 1/2014 | Tokimitsu |
| 2014/0141362 | A1 | 5/2014 | Watariguchi |
| 2015/0093693 | A1 | 4/2015 | Watariguchi |
| 2015/0346617 | A1 | 12/2015 | Kawahara |
| 2015/0362847 | A1 | 12/2015 | Tanaka |
| 2018/0314171 | A1* | 11/2018 | Watariguchi ......... G03G 5/0525 |
| 2019/0243260 | A1* | 8/2019 | Ito .......................... G03G 5/144 |

FOREIGN PATENT DOCUMENTS

| | | | |
|---|---|---|---|
| JP | 2002-287396 | A | 10/2002 |
| JP | 2003-177561 | A | 6/2003 |
| JP | 2005-338445 | A | 12/2005 |
| JP | 2008-19417 | A | 1/2008 |
| JP | 2011-95298 | A | 5/2011 |
| JP | 2019-139021 | A | 8/2019 |
| JP | 2021-67748 | A | 4/2021 |

OTHER PUBLICATIONS

U.S. Appl. No. 17/814,048, Kaname Watariguchi, filed Jul. 21, 2022.
U.S. Appl. No. 17/814,655, Tatsuya Yamaai, filed Jul. 25, 2022.
U.S. Appl. No. 17/815,276, Akihiro Maruyama, filed Jul. 27, 2022.
U.S. Appl. No. 17/816,024, Kenichi Kaku, filed Jul. 29, 2022.
U.S. Appl. No. 17/816,028, Kohei Makisumi, filed Jul. 29, 2022.

* cited by examiner

ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

Field of the Invention

The present invention relates to an electrophotographic photosensitive member, a process cartridge including the electrophotographic photosensitive member, and an electrophotographic apparatus including the electrophotographic photosensitive member.

Description of the Related Art

As an electrophotographic photosensitive member (hereinafter also simply referred to as "photosensitive member") to be used in an electrophotographic image-forming apparatus, an organic photosensitive member has heretofore been spreading because the photosensitive member has advantages, such as a low price and high productivity. The organic photosensitive member is formed by arranging, on a support, a photosensitive layer (organic photosensitive layer) using an organic material as a photoconductive substance (a charge-generating substance or a charge-transporting substance). A photosensitive member including a laminated photosensitive layer is the mainstream of the organic photosensitive member from the viewpoints of high sensitivity and the variety of material design. The laminated photosensitive layer is formed by laminating a charge-generating layer containing a charge-generating substance, such as a photoconductive dye or a photoconductive pigment, and a charge-transporting layer containing a charge-transporting substance, such as a photoconductive polymer or a photoconductive low-molecular weight compound.

In recent years, an electrophotographic apparatus that can form an image having higher quality has been required, and hence a photosensitive member suppressed from causing a sensitivity change at the time of a fluctuation in external environment, such as a temperature or a humidity, and at the time of its repeated use has been desired from the viewpoint of the stability of image quality.

In Japanese Patent Application Laid-Open No. H11-38709, there is a description of an electrophotographic apparatus obtained by combining: such a photosensitive member that the ratio at which its potential is decayed by exposure has positive characteristics against a temperature and a humidity; and a charging device whose initial charge potential has positive characteristics against the temperature and the humidity. The potential decay ratio of the photosensitive member and the initial charge potential of the charging device each have positive characteristics against the temperature and the humidity to provide the apparatus with a region in which the potential decay curves of the photosensitive member in different temperature and humidity environments intersect each other at the time of fluctuations in temperature and humidity. Thus, a fluctuation in optical discharge characteristic of the photosensitive member due to the fluctuations in temperature and humidity, and a fluctuation in initial charge potential of the charging device are offset against each other, and hence a fluctuation in potential of the photosensitive member due to the fluctuations in temperature and humidity can be suppressed.

In Japanese Patent Application Laid-Open No. 2008-19417, there are descriptions of a phthalocyanine crystal, which is obtained through a step of bringing a phthalocyanine crystal precursor into contact with an aromatic aldehyde compound to convert its crystal form, and a photosensitive member including the phthalocyanine crystal. When the phthalocyanine crystal is used in the photosensitive member, the photosensitive member has high sensitivity, and can be suppressed from causing a sensitivity fluctuation with a humidity change.

In Japanese Patent Application Laid-Open No. 2011-95298, there is a description of a photosensitive member including a specific photosensitive layer and a specific protection layer. The photosensitive member described in Japanese Patent Application Laid-Open No. 2011-95298 includes, in the photosensitive layer, a charge-generating substance containing an adduct of: oxytitanium phthalocyanine; and a diol compound having a hydroxy group on each of its two adjacent carbon atoms. In addition, the photosensitive member described in Japanese Patent Application Laid-Open No. 2011-95298 includes, in the protection layer, a product obtained through the reaction of metal oxide particles whose surfaces have been treated with a compound having a reactive organic group. When the photosensitive member includes the protection layer, an excellent airtight holding property is obtained, and hence fluctuations in charging characteristic and sensitivity characteristic of the photosensitive member due to changes in temperature and humidity, and a fluctuation in image density at the time of repeated use thereof can be suppressed.

Along with recent downsizing and speed-up of an electrophotographic apparatus, an environment in which heat is liable to accumulate is established in the electrophotographic apparatus at the time of its repeated use. Examples of causes for increases in temperature and humidity occurring at the time of the use of the electrophotographic apparatus include: heat release from the fixing unit of the apparatus; heat of friction between the photosensitive member and photosensitive member cleaning unit thereof; heat release from paper warmed at the time of double-sided printing; and increases in temperature and humidity of an environment surrounding the electrophotographic apparatus due to the use of an air conditioner or the like. In particular, when the electrophotographic apparatus is used under a low-temperature and low-humidity environment, the widths of increases in temperature and humidity in the electrophotographic apparatus at the time of its repeated use are large, and hence a fluctuation in tinge of an image resulting from a change in sensitivity of its electrophotographic photosensitive member is liable to be a problem.

According to an investigation made by the inventors of the present invention, the photosensitive members described in Japanese Patent Application Laid-Open No. H11-38709, Japanese Patent Application Laid-Open No. 2008-19417, and Japanese Patent Application Laid-Open No. 2011-95298 are susceptible to improvement in terms of a sensitivity change due to fluctuations in temperature and humidity, and the suppression of a potential fluctuation at the time of repeated use. Accordingly, when any one of the photosensitive members is repeatedly used under a low-temperature and low-humidity environment, a fluctuation in tinge of an image has become a problem in some cases.

SUMMARY OF THE INVENTION

Accordingly, an object of the present invention is to provide an electrophotographic photosensitive member that is suppressed from causing a fluctuation in tinge of an image at the time of its repeated use involving increases in temperature and humidity thereof under a low-temperature and low-humidity environment.

The object is achieved by the present invention to be described below.

That is, according to the present invention, there is provided an electrophotographic photosensitive member including in this order: a support; an undercoat layer; a charge-generating layer; and a charge-transporting layer, wherein with regard to an $S_0$, an $S_1$, an $S_2$, an $S_3$, and an $S_4$ determined by the following procedure (A), a ratio $S_1/S_0$ is 0.34 or less, and one of the $S_2$, the $S_3$, or the $S_4$ is a positive value, and another two thereof are negative values, or two thereof are positive values, and another one thereof is a negative value:

procedure (A)

A1. a temperature of 15° C. is represented by $T_1$ [° C.] and a relative humidity of 45% RH is represented by $\Phi_1$ [% RH], and a $V_{exp}$ [V] corresponding to each $I_{exp}$ [μJ/cm²] is obtained at the temperature $T_1$ [° C.] and the relative humidity $\Phi_1$ [% RH] by the following procedure (B);

procedure (B)

the following B1 to B5 are performed while the electrophotographic photosensitive member is rotated at a rotational speed of 60 rpm:

B1. a surface potential is set to 0;

B2. a voltage is applied to a surface of the electrophotographic photosensitive member so that an absolute value of the surface potential becomes 500 V;

B3. exposure is performed with light having a wavelength of 655 nm and a light amount $I_{exp}$ [μJ/cm²] 0.125 second after completion of the voltage application;

B4. the absolute value of the surface potential obtained through measurement 0.250 second after the completion of the voltage application is represented by $V_{exp}$ [V]; and B5. while the $I_{exp}$ is changed from 0.000 J/cm² to 1.000 J/cm² at intervals of 0.001 μJ/cm², the B1 to the B4 are repeatedly performed to provide the $V_{exp}$ [V] corresponding to each $I_{exp}$ [μJ/cm²];

A2. a temperature of 45° C. is represented by $T_2$ [° C.] and a relative humidity of 16% RH is represented by $\Phi_2$ [% RH], and the $V_{exp}$ [V] corresponding to each $I_{exp}$ [μJ/cm²] is obtained at the temperature $T_2$ [° C.] and the relative humidity $\Phi_2$ [% RH] by the procedure (B);

A3. the $V_{exp}$ [V] obtained in the A1 is plotted to produce a graph whose axis of ordinate and axis of abscissa indicate the $V_{exp}$ [V] and the $I_{exp}$, respectively, and a slope "k" in a range of the $I_{exp}$ of from 0.000 to 0.030 μJ/cm² is determined, followed by determination of quantum efficiency $\eta_0$ ($T_1$, $\Phi_1$) from the following equation (1):

$$k = \frac{ed\eta_0}{\varepsilon_0 \varepsilon_r h\nu} \quad (1)$$

in the equation (1), "e" represents an elementary charge, "d" represents a thickness of a photosensitive layer, $\eta_0$ represents the quantum efficiency, $\varepsilon_0$ represents a dielectric constant of vacuum, εr represents a relative dielectric constant of the charge-transporting layer, "h" represents the Planck constant, and ν represents a frequency of the applied light;

A4. a recombination constant $P_e$ ($T_1$, $\Phi_1$) and a residual voltage $V_r$ ($T_1$, $\Phi_1$) at the temperature $T_1$ [° C.] and the relative humidity $\Phi_1$ [% RH] are determined by subjecting the graph produced in the A3 to fitting through use of the following equation (2) where the value of the quantum efficiency $\eta_0$ determined in the A3 is used at a time of the fitting, thereby a relationship between the $V_{exp}$ [V] ($T_1$, $\Phi_1$) and the $I_{exp}$ [μJ/cm²] under conditions of the temperature $T_1$ [° C.] and the relative humidity $\Phi_1$ [% RH], the relationship according to the following equation (2), is obtained:

$$\frac{V_{exp} - V_r}{V_d - V_r} = \left[1 - (1 - P_e)\frac{ed\eta_0 I_{exp}}{\varepsilon_0 \varepsilon_r h\nu (V_d - V_r)}\right]^{1/(1-P_e)} \quad (2)$$

in the equation (2), $V_r$ represents the residual voltage, $V_d$ represents the absolute value (500 V) of the surface potential before the exposure, $P_e$ represents the recombination constant, "e" represents the elementary charge, "d" represents the thickness of the photosensitive layer, $\eta_0$ represents the quantum efficiency, ε0 represents the dielectric constant of vacuum, εr represents the relative dielectric constant of the charge-transporting layer, "h" represents the Planck constant, and ν represents the frequency of the applied light;

A5. quantum efficiency $\eta_0$ ($T_2$, $\Phi_2$), a recombination constant $P_e$ ($T_2$, $\Phi_2$), and a residual voltage $V_r$ ($T_2$, $\Phi_2$) at the temperature $T_2$ [° C.] and the relative humidity $\Phi_2$ [% RH] are determined for the $V_{exp}$ [V] obtained in the A2 in the same manner as in the A3 and the A4, thereby a relationship between the $V_{exp}$ [V] ($T_2$, $\Phi_2$) and the $I_{exp}$ [μJ/cm²] under conditions of the temperature $T_2$ [° C.] and the relative humidity $\Phi_2$ [% RH], the relationship according to the equation (2), is obtained;

A6. a value obtained by subtracting the $V_{exp}$ [V] ($T_2$, $\Phi_2$) from the $V_{exp}$ [V] ($T_1$, $\Phi_1$) is represented by $\Delta V_{exp}$ [V];

A7. with regard to the $V_{exp}$ [V] obtained in the A1, the light amount when $V_{exp}$ [V]=250 V is represented by $I_{1/2}$ [μJ/cm²], and the $V_{exp}$ [V] when $I_{exp}$ [μJ/cm²]=3.414·$I_{1/2}$ [μJ/cm²] is represented by $V_R$ [V], and at this time, an integrated value of a $|\Delta V_{exp}|$ [V] when the $V_{exp}$ [V] ($T_1$, $\Phi_1$) falls within a range of from the $V_R$ [V] to 500 V in a relationship between the $|\Delta V_{exp}|$ [V] and the $V_{exp}$ [V] ($T_1$, $\Phi_1$) is represented by $S_0$;

A8. a relationship between the $I_{exp}$ [μJ/cm²] and the $V_{exp}$ [V] is obtained by using the equation (2) with the values of the quantum efficiency $\eta_0$ ($T_1$, $\Phi_1$), the recombination constant $P_e$ ($T_1$, $\Phi_1$), and the residual voltage $V_r$ ($T_2$, $\Phi_2$);

A9. a value obtained by subtracting the $V_{exp}$ [V] obtained in the A8 from the $V_{exp}$ [V] ($T_1$, $\Phi_1$) is represented by $\Delta V_a$ [V];

A10. an integrated value of a $|\Delta V_a|$ [V] when the $V_{exp}$ [V] ($T_1$, $\Phi_1$) falls within the range of from the $V_R$ [V] to 500 V in a relationship between the $|\Delta V_a|$ [V] and the $V_{exp}$ [V] ($T_1$, $\Phi_1$) is represented by $S_1$, and an integrated value of the $\Delta V_a$ [V] when the $V_{exp}$[V] ($T_1$, $\Phi_1$) falls within the range of from the $V_R$ [V] to 500 V in a relationship between the $\Delta V_a$ [V] and the $V_{exp}$ [V] ($T_1$, $\Phi_1$) is represented by $S_2$;

A11. the relationship between the $I_{exp}$ [μJ/cm²] and the $V_{exp}$ [V] is obtained by using the equation (2) with the values of the quantum efficiency $\eta_0$ ($T_2$, $\Phi_2$), the recombination constant $P_e$ ($T_1$, $\Phi_1$), and the residual voltage $V_r$ ($T_1$, $\Phi_1$);

A12. a value obtained by subtracting the $V_{exp}$ [V] obtained in the A11 from the $V_{exp}$ [V] ($T_1$, $\Phi_1$) is represented by $\Delta V_b$ [V];

A13. an integrated value of the $\Delta V_b$ [V] when the $V_{exp}$ [V] ($T_1$, $\Phi_1$) falls within the range of from the $V_R$ [V] to 500 V in a relationship between the $\Delta V_b$ [V] and the $V_{exp}$[V] ($T_1$, $\Phi_1$) is represented by $S_3$;

A14. the relationship between the $I_{exp}$ [μJ/cm$^2$] and the $V_{exp}$ [V] is obtained by using the equation (2) with the values of the quantum efficiency $\eta_0$ ($T_1$, $\Phi_1$), the recombination constant $P_e$ ($T_2$, $\Phi_2$), and the residual voltage $V_r$ ($T_1$, $\Phi_1$);

A15. a value obtained by subtracting the $V_{exp}$ [V] obtained in the A14 from the $V_{exp}$ [V] ($T_1$, $\Phi_1$) is represented by $\Delta V_c$ [V]; and A16. an integrated value of the $\Delta V_c$ [V] when the $V_{exp}$ [V] ($T_1$, $\Phi_1$) falls within the range of from the $V_R$ [V] to 500 V in a relationship between the $\Delta V_c$ [V] and the $V_{exp}$[V] ($T_1$, $\Phi_1$) is represented by $S_4$.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

An electrophotographic photosensitive member according to the present invention includes in this order: a support; an undercoat layer; a charge-generating layer; and a charge-transporting layer, wherein with regard to an $S_0$, an $S_1$, an $S_2$, an $S_3$, and an $S_4$ determined by the following procedure (A), the following relationships are established: a ratio $S_1/S_0$ is 0.34 or less, and one of the $S_2$, the $S_3$, or the $S_4$ is a positive value, and the other two thereof are negative values, or two thereof are positive values, and the other one thereof is a negative value.

Procedure (A)

A1. A temperature of 15° C. is represented by $T_1$ [° C.] and a relative humidity of 45% RH is represented by $\Phi_1$ [% RH], and a $V_{exp}$ [V] corresponding to each $I_{exp}$ [μJ/cm$^2$] is obtained at the temperature $T_1$ [° C.] and the relative humidity $\Phi_1$ [% RH] by the following procedure (B).

Procedure (B)

The following B1 to B5 are performed while the electrophotographic photosensitive member is rotated at a rotational speed of 60 rpm.

B1. A surface potential is set to 0.

B2. A voltage is applied to a surface of the electrophotographic photosensitive member so that an absolute value of the surface potential becomes 500 V.

B3. Exposure is performed with light having a wavelength of 655 nm and a light amount $I_{exp}$ [μJ/cm$^2$] 0.125 second after completion of the voltage application.

B4. The absolute value of the surface potential obtained through measurement 0.250 second after the completion of the voltage application is represented by $V_{exp}$ [V].

Figure 1:
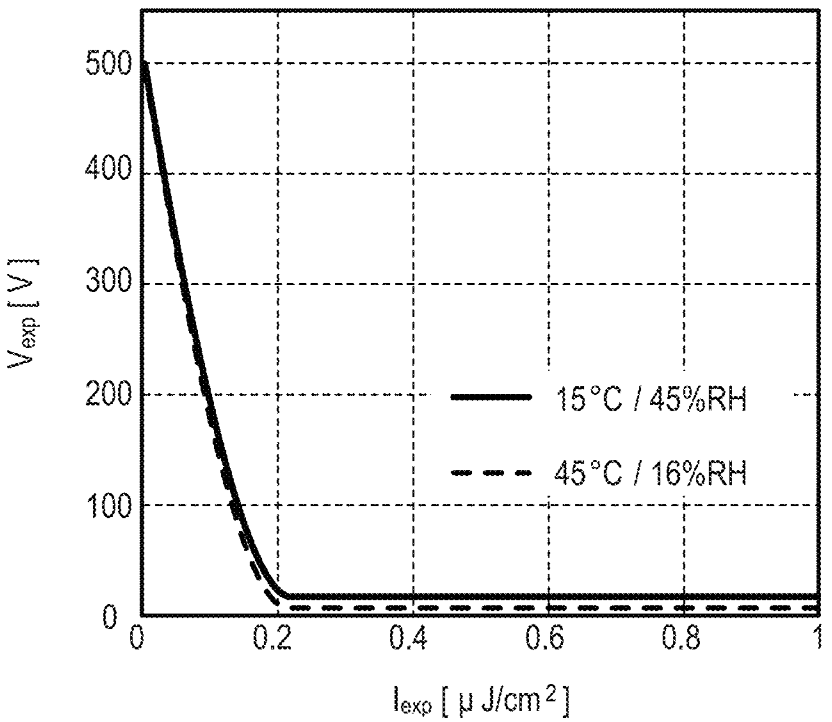
FIG. 1 is an example of a graph for showing a relationship between a $V_{exp}$ [V] and an $I_{exp}$ [μJ/cm$^2$].

B5. While the $I_{exp}$ is changed from 0.000 J/cm$^2$ to 1.000 J/cm$^2$ at intervals of 0.001 μJ/cm$^2$, the B1 to the B4 are repeatedly performed to provide the $V_{exp}$ [V] corresponding to each $I_{exp}$ [μJ/cm$^2$]. An example of a graph for showing a relationship between the $V_{exp}$ [V] thus obtained and the $I_{exp}$ [μJ/cm$^2$] is shown in FIG. 1.

A2. A temperature of 45° C. is represented by $T_2$ [° C.] and a relative humidity of 16% RH is represented by $\Phi_2$ [% RH], and the $V_{exp}$ [V] corresponding to each $I_{exp}$ [μJ/cm$^2$] is obtained at the temperature $T_2$ [° C.] and the relative humidity $\Phi_2$ [% RH] by the procedure (B).

A3. The $V_{exp}$ [V] obtained in the A1 is plotted to produce a graph whose axis of ordinate and axis of abscissa indicate the $V_{exp}$ [V] and the $I_{exp}$, respectively, and a slope "k" in a range of the $I_{exp}$ of from 0.000 to 0.030 μJ/cm$^2$ is determined, followed by determination of quantum efficiency $\eta_0$ ($T_1$, $\Phi_1$) from the following equation (1):

$$k = \frac{ed\eta_0}{\varepsilon_0 \varepsilon_r h\nu} \quad (1)$$

in the equation (1), "e" represents an elementary charge, "d" represents a thickness of a photosensitive layer, $\eta_0$ represents the quantum efficiency, ε0 represents a dielectric constant of vacuum, $\varepsilon_r$ represents a relative dielectric constant of the charge-transporting layer, "h" represents the Planck constant, and ν represents a frequency of the applied light.

A4. A recombination constant $P_e$ ($T_1$, $\Phi_1$) and a residual voltage $V_r$ ($T_1$, $\Phi_1$) at the temperature $T_1$ [° C.] and the relative humidity $\Phi_1$ [% RH] are determined by subjecting the graph produced in the A3 to fitting through use of the following equation (2) where the value of the quantum efficiency $\eta_0$ determined in the A3 is used at the time of the fitting, thereby a relationship between the $V_{exp}$ [V] ($T_1$, $\Phi_1$) and the $I_{exp}$ [μJ/cm$^2$] under conditions of the temperature $T_1$ [° C.] and the relative humidity $\Phi_1$ [% RH], the relationship according to the following equation (2), is obtained:

$$\frac{V_{exp} - V_r}{V_d - V_r} = \left[1 - (1 - P_e)\frac{ed\eta_0 I_{exp}}{\varepsilon_0 \varepsilon_r h\nu(V_d - V_r)}\right]^{1/(1-P_e)} \quad (2)$$

in the equation (2), $V_r$ represents the residual voltage, $V_a$ represents the absolute value (500 V) of the surface potential before the exposure, $P_e$ represents the recombination constant, "e" represents the elementary charge, "d" represents the thickness of the photosensitive layer, $\eta_0$ represents the quantum efficiency, $\varepsilon_0$ represents the dielectric constant of vacuum, $\varepsilon_r$ represents the relative dielectric constant of the charge-transporting layer, "h" represents the Planck constant, and v represents the frequency of the applied light.

A5. Quantum efficiency $\eta_0$ ($T_2$, $\Phi_2$), a recombination constant $P_e$ ($T_2$, $\Phi_2$), and a residual voltage $V_r$ ($T_2$, $\Phi_2$) at the temperature $T_2$ [° C.] and the relative humidity $\Phi_2$ [% RH] are determined for the $V_{exp}$ [V] obtained in the A2 in the same manner as in the A3 and the A4, thereby a relationship between the $V_{exp}$ [V] ($T_2$, $\Phi_2$) and the $I_{exp}$ [μJ/cm$^2$] under conditions of the temperature $T_2$ [° C.] and the relative humidity $\Phi_2$ [% RH], the relationship according to the equation (2), is obtained.

A6. A value obtained by subtracting the $V_{exp}$ [V] ($T_2$, $\Phi_2$) from the $V_{exp}$ [V] ($T_1$, $\Phi_1$) is represented by $\Delta V_{exp}$ [V].

A7. With regard to the $V_{exp}$ [V] obtained in the A1, the light amount when $V_{exp}$[V]=250 V is represented by $I_{1/2}$ [μJ/cm$^2$], and the $V_{exp}$ [V] when $I_{exp}$ [μJ/cm$^2$]=3.414·$I_{1/2}$ [μJ/cm$^2$] is represented by $V_R$ [V], and at this time, an integrated value of a $|\Delta V_{exp}|$ [V] when the $V_{exp}$ [V] ($T_1$, $\Phi_1$) falls within a range of from the $V_R$ [V] to 500 V in a relationship between the $|\Delta V_{exp}|$ [V] and the $V_{exp}$ [V] ($T_1$, $\Phi_1$) is represented by $S_0$.

A8. A relationship between the $I_{exp}$ [μJ/cm$^2$] and the $V_{exp}$ [V] is obtained by using the equation (2) with the values of the quantum efficiency $\eta_0$ ($T_1$, $\Phi_1$), the recombination constant $P_e$ ($T_1$, $\Phi_1$), and the residual voltage $V_r$ ($T_2$, $\Phi_2$).

A9. A value obtained by subtracting the $V_{exp}$ [V] obtained in the A8 from the $V_{exp}$ [V] ($T_1$, $\Phi_1$) is represented by $\Delta V_a$ [V].

A10. An integrated value of a $|\Delta V_a|$ [V] when the $V_{exp}$ [V] ($T_1$, $\Phi_1$) falls within the range of from the $V_R$ [V] to 500 V in a relationship between the $|\Delta V_a|$ [V] and the $V_{exp}$[V] ($T_1$, $\Phi_1$) is represented by $S_1$, and an integrated value of the $\Delta V_a$ [V] when the $V_{exp}$[V] ($T_1$, $\Phi_1$) falls within the range of from the $V_R$ [V] to 500 V in a relationship between the $\Delta V_a$ [V] and the $V_{exp}$ [V] ($T_1$, $\Phi_1$) is represented by $S_2$.

A11. The relationship between the $I_{exp}$ [μJ/cm$^2$] and the $V_{exp}$ [V] is obtained by using the equation (2) with the values of the quantum efficiency $\eta_0$ ($T_2$, $\Phi_2$), the recombination constant $P_e$ ($T_1$, $\Phi_1$), and the residual voltage $V_r$ ($T_1$, $\Phi_1$).

A12. A value obtained by subtracting the $V_{exp}$ [V] obtained in the A11 from the $V_{exp}$ [V] ($T_1$, $\Phi_1$) is represented by $\Delta V_b$ [V].

A13. An integrated value of the $\Delta V_b$ [V] when the $V_{exp}$ [V] ($T_1$, $\Phi_1$) falls within the range of from the $V_R$ [V] to 500 V in a relationship between the $\Delta V_b$ [V] and the $V_{exp}$[V] ($T_1$, $\Phi_1$) is represented by $S_3$.

A14. The relationship between the $I_{exp}$ [μJ/cm$^2$] and the $V_{exp}$ [V] is obtained by using the equation (2) with the values of the quantum efficiency $\eta_0$ ($T_1$, $\Phi_1$), the recombination constant $P_e$ ($T_2$, $\Phi_2$), and the residual voltage $V_r$ ($T_1$, $\Phi_1$).

A15. A value obtained by subtracting the $V_{exp}$ [V] obtained in the A14 from the $V_{exp}$ [V] ($T_1$, $\Phi_1$) is represented by $\Delta V_c$ [V].

A16. An integrated value of the $\Delta V_c$ [V] when the $V_{exp}$ [V] ($T_1$, $\Phi_1$) falls within the range of from the $V_R$ [V] to 500 V in a relationship between the $\Delta V_c$ [V] and the $V_{exp}$[V] ($T_1$, $\Phi_1$) is represented by $S_4$.

In the foregoing, the relative dielectric constant $\varepsilon_r$ of the charge-transporting layer may be determined by impedance measurement.

In addition, the $V_R$ [V] defined as the $V_{exp}$ [V] when $I_{exp}$ [μJ/cm$^2$]=3.414·$I_{1/2}$ [μJ/cm$^2$] means a potential when the surface potential of the photosensitive member is reduced by the exposure until the surface potential is substantially free from reducing any more. In addition, the light amount 3.414·$I_{1/2}$ [μJ/cm$^2$] for reducing the surface potential of the photosensitive member until the surface potential is substantially free from reducing any more is determined as described below.

Figure 2:
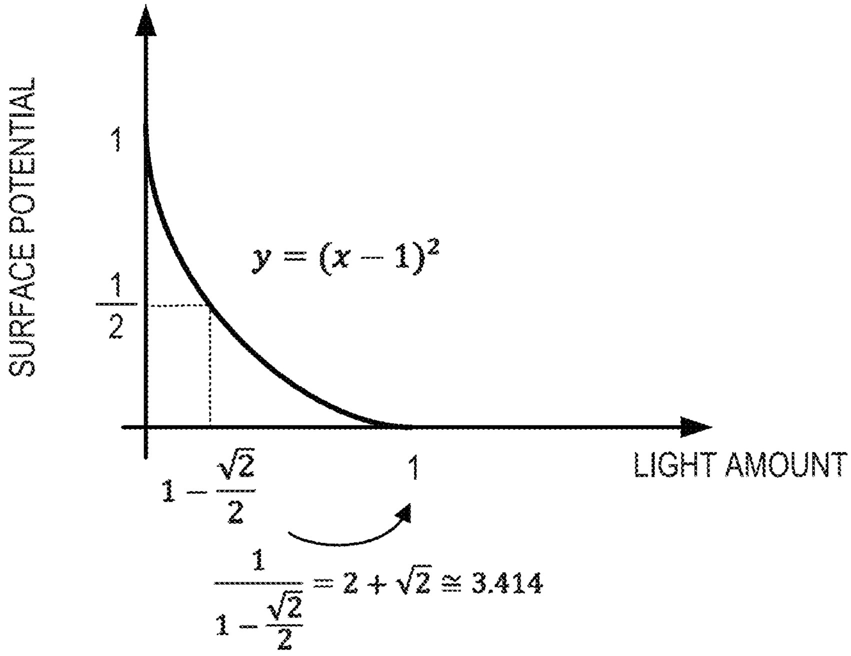
FIG. 2 is a graph for schematically showing a relationship between a surface potential in a photosensitive member and the light amount of exposure.

FIG. 2 is a graph for schematically showing a relationship between the surface potential in the photosensitive member and the light amount of the exposure. The axis of ordinate and axis of abscissa of the graph indicate the surface potential and the light amount, respectively. The relative value of the surface potential at the time of the first charging is set to 1, and the relative value of the surface potential when the surface potential is reduced until the surface potential is substantially free from reducing any more is set to 0, and the relative value of the light amount at this time is set to 1. The light amount at an initial surface potential of 1 is 0. A curve obtained by the setting is approximated to the quadratic function "$y=(x-1)^2$." At this time, as shown in FIG. 2, in the quadratic function, the relative value of the light amount at the point at which the relative value of the surface potential is 0, that is, a light amount of 1 is 3.414 times as large as the light amount ($1-\sqrt{2}/2$) at the point at which the relative value of the surface potential becomes one half of the initial value.

In view of the foregoing, in the procedure (A), a value obtained by multiplying the light amount $I_{1/2}$ [μJ/cm$^2$] needed for reducing a surface potential of 500 V at the time of the first charging (B2 in the procedure (B)) to one half, that is, 250 V by 3.414 is defined as the light amount needed for obtaining the $V_R$ [V]. Thus, although the sensitivity of a reduction in surface potential to the exposure varies from photosensitive member to photosensitive member, the light amount for obtaining the $V_R$ [V] in consideration of the difference in sensitivity between the photosensitive members may be determined.

Figure 3:
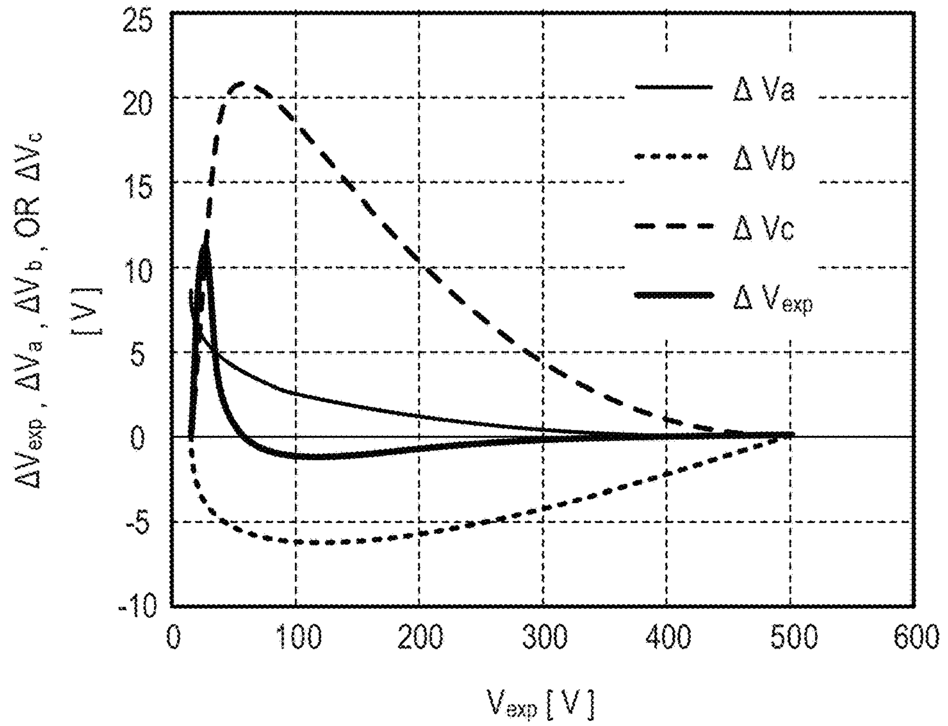
FIG. 3 is an example of a graph for showing a relationship between each of a $\Delta V_{exp}$ [V], a $\Delta V_a$ [V], a $\Delta V_b$ [V], and a $\Delta V_c$ [V], and the $V_{exp}$ [V].

The $\Delta V_a$ [V], the $\Delta V_b$ [V], and the $\Delta V_c$ [V] in the procedure (A) are obtained by separating contribution to the $\Delta V_{exp}$ [V] into the residual voltage, the quantum efficiency, and the recombination constant, respectively. An example of a graph for showing a relationship between each of the $\Delta V_{exp}$ [V], the $\Delta V_a$ [V], the $\Delta V_b$ [V], and the $\Delta V_c$ [V], and the $V_{exp}$ [V] is shown in FIG. 3.

When the $S_0$, the $S_1$, the $S_2$, the $S_3$, and the $S_4$ are determined, as described in the procedure (A), the $|\Delta V_{exp}|$ [V], the $\Delta V_a$ [V], the $\Delta V_b$ [V], and the $\Delta V_c$ [V] are each integrated in the range of the $V_{exp}$ [V] ($T_1$, $\Phi_1$) of from the $V_R$ [V] to 500 V. In other words, the contribution of each of the residual voltage, the quantum efficiency, and the recombination constant to the $\Delta V_{exp}$ is comprehensively evaluated by the procedure (A) in the range of from the $V_R$ [V] to the surface potential at the time of the first charging (500 V). The reason for the foregoing is as described below.

Figure 4A:
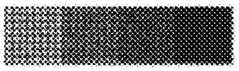
FIG. 4A is a view for illustrating control based on analog gradation in the formation of a halftone image with an electrophotographic apparatus.
Figure 4B:
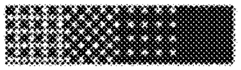
FIG. 4B is a view for illustrating control based on digital gradation in the formation of the halftone image with the electrophotographic apparatus.
Figure 4C:
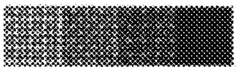
FIG. 4C is a view for illustrating actual gradation control in the formation of the halftone image with the electrophotographic apparatus.
Figure 4D:
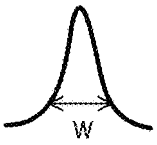
FIG. 4D is a view for illustrating the spot diameter of laser light to be used in exposure in the formation of the halftone image with the electrophotographic apparatus.

FIG. 4A to FIG. 4D are each a view for illustrating gradation in the formation of a halftone image with an electrophotographic apparatus. In each of FIG. 4A to FIG. 4D, a case in which the resolution of the image is 600 dpi and 1 dot measures 42 μm by 42 μm is illustrated as an example. As illustrated in FIG. 4A, in analog gradation, the gradation of the image is controlled by the surface potential of the photosensitive member, and hence the control can be said to be macroscopic control. Meanwhile, in digital gradation, as illustrated in FIG. 4B, the gradation thereof is controlled by the area ratio thereof, and hence the control can be said to be microscopic control. In actual image formation, the gradation is controlled based on both of the analog gradation and the digital gradation as illustrated in FIG. 4C because the spot diameter "w" of laser to be used in the exposure of the photosensitive member has some degree of width as illustrated in FIG. 4D. That is, the analog gradation is used in a place where the spot diameter "w" is sufficiently thick as compared to 1 dot, and the digital gradation is used in a place where the spot diameter "w" is sufficiently thin as compared to 1 dot.

Accordingly, in the actual formation of the halftone image, the halftone density thereof is influenced not only by the surface potential after the exposure but also by a fluctuation in surface potential due to changes in temperature and humidity in the entire range of from the surface potential at the time of the first charging to the surface potential after the exposure. Accordingly, in the present invention, the contribution of the changes in temperature and humidity to the fluctuation in surface potential is comprehensively evaluated in the range of from the $V_R$ [V] to a surface potential of 500 V at the time of the first charging.

The inventors of the present invention have assumed the reasons why the electrophotographic photosensitive member according to the present invention can suppress a fluctuation in tinge of an image at the time of its repeated use involving increases in temperature and humidity thereof under a low-temperature and low-humidity environment to be as described below.

A first reason is as follows: in the electrophotographic photosensitive member according to the present invention, the contribution of the residual voltage to a fluctuation in sensitivity of the photosensitive member due to changes in temperature and humidity is small, and hence the ratio $S_1/S_0$ is equal to or less than a predetermined value. The inventors have conceived that as a result of the foregoing, a fluctuation in number of charges retained in the photosensitive member with the changes in temperature and humidity is suppressed, and hence, at the time of the repeated use involving the increases in temperature and humidity, an increase in number of retained charges resulting from the repeated use is also suppressed, thereby enabling the suppression of the fluctuation in sensitivity of the photosensitive member.

With regard to the value of the ratio $S_1/S_0$, as long as the ratio is 0.34 or less at $T_1$=15° C., $\Phi_1$=45% RH, $T_2$=45° C., and $\Phi_2$=16% RH, the fluctuation in sensitivity of the photosensitive member at the time of the repeated use is suppressed. The ratio $S_1/S_0$ is preferably 0.28 or less.

In addition, the absolute value $|\Delta V_r\ [V]|$ of a difference between the residual voltage at $T_1$=15° C. and $\Phi_1$=45% RH, and the residual voltage at $T_2$=45° C. and $\Phi_2$=16% RH is preferably 20 V or less. When the $|\Delta V_r\ [V]|$ is 20 V or less, an influence of the retained charges can be further suppressed.

A second reason is as follows: one of the three elements that contribute to the sensitivity of the photosensitive member, that is, the quantum efficiency, the recombination constant, and the residual voltage contributes to the fluctuation in sensitivity due to the changes in temperature and humidity in a direction opposite to those of the remaining two. That is, one of the $S_2$, the $S_3$, or the $S_4$ is a positive value, and the other two thereof are negative values, or two thereof are positive values, and the other one thereof is a negative value. Thus, even when a temperature and a humidity in the electrophotographic apparatus are increased by the repeated use of the photosensitive member, and hence the contribution of each of the three elements, that is, the quantum efficiency, the recombination constant, and the residual voltage to the fluctuation in sensitivity of the photosensitive member becomes larger, the contribution of one of the elements acts in the direction opposite to that of the contribution of each of the remaining two elements. The inventors have conceived that as a result of the foregoing, the fluctuations in sensitivity of the photosensitive member cancel each other, and hence a comprehensive fluctuation in sensitivity of the photosensitive member with the changes in temperature and humidity can be suppressed.

The inventors have assumed that the suppression of the fluctuation in sensitivity of the photosensitive member at the time of the repeated use involving the increases in temperature and humidity under the low-temperature and low-humidity environment is achieved by the foregoing two mechanisms.

The configuration of the photosensitive member according to the present invention is specifically described below.

[Electrophotographic Photosensitive Member]

Figure 5:
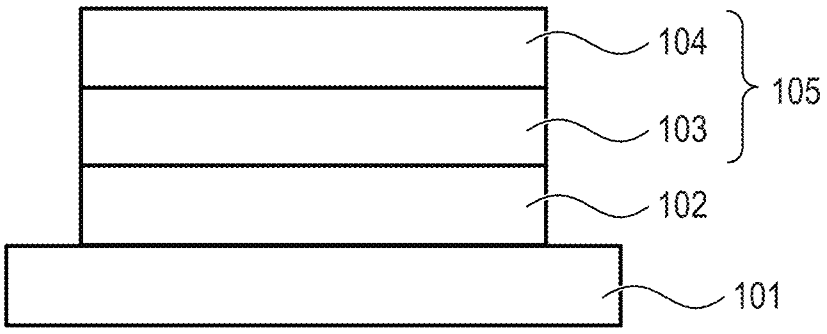
FIG. 5 is a view for illustrating an example of the layer configuration of an electrophotographic photosensitive member according to the present invention.

The electrophotographic photosensitive member according to the present invention includes the support, the undercoat layer, the charge-generating layer, and the charge-transporting layer in the stated order. FIG. 5 is a view for illustrating an example of the layer configuration of the electrophotographic photosensitive member. In FIG. 5, the support is represented by reference numeral 101, the undercoat layer is represented by reference numeral 102, the charge-generating layer is represented by reference numeral 103, the charge-transporting layer is represented by reference numeral 104, and the photosensitive layer (laminated photosensitive layer) is represented by reference numeral 105.

<Support>

In the present invention, the support is preferably an electroconductive support having electroconductivity. An example of the electroconductive support is a support in which a thin film of a metal, such as aluminum, chromium, silver, or gold, a thin film of an electroconductive material, such as indium oxide, tin oxide, or zinc oxide, or a thin film of an electroconductive ink added thereto a silver nanowire is formed on a support formed of a metal, such as aluminum, iron, nickel, copper, or gold, or an alloy, or an insulating support, such as a polyester resin, a polycarbonate resin, a polyimide resin, or glass.

The surface of the support may be subjected to, for example, electrochemical treatment such as anodization, wet honing treatment, blast treatment, or cutting treatment for improving its electrical characteristics and suppressing interference fringes. The shape of the support is, for example, a cylindrical shape or a film shape.

<Electroconductive Layer>

In the photosensitive member according to the present invention, an electroconductive layer may be arranged on the support. The arrangement of the electroconductive layer can cover the unevenness and defects of the support, and prevent interference fringes.

The electroconductive layer preferably contains electroconductive particles and a binder resin. Examples of the electroconductive particles include particles formed of carbon black, a metal, and a metal oxide. Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver. Of those, metal oxide particles are preferably used as the electroconductive particles, and in particular, titanium oxide particles, tin oxide particles, and zinc oxide particles are more preferably used. When the metal oxide particles are used as the electroconductive particles, the surfaces of the metal oxide particles may be treated with a silane coupling agent or the like, or the metal oxide particles may be doped with an element, such as phosphorus or aluminum, or an oxide thereof. As the element and the oxide thereof for doping, there are given, for example, phosphorus, aluminum, niobium, and tantalum. In addition, each of the electroconductive particles may be of a laminated construction having a core particle and a coating layer coating the particle. A material for the core particle is, for example, titanium oxide, barium sulfate, or zinc oxide. A material for the coating layer is, for example, a metal oxide, such as tin oxide or titanium oxide.

In addition, when the metal oxide particles are used as the electroconductive particles, the volume-average particle diameter of the metal oxide particles is preferably 1 to 500 nm, more preferably 3 to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin. In addition, the electroconductive layer may further contain a concealing agent, such as a silicone oil, resin particles, or titanium oxide.

The thickness of the electroconductive layer is preferably 1 to 50 μm, more preferably 3 to 40 μm. The electroconductive layer may be formed by preparing a coating liquid for an electroconductive layer containing the above-mentioned materials and a solvent, forming a coat thereof, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. A dispersion method for the dispersion of the electroconductive particles in the coating liquid for an electroconductive layer is, for example, a method including using a paint shaker, a sand mill, a ball mill, or a liquid collision-type high-speed disperser.

<Undercoat Layer>

In the photosensitive member according to the present invention, the undercoat layer is arranged between the support or the electroconductive layer and the charge-generating layer. The undercoat layer preferably contains a polyamide resin and titanium oxide particles.

A polyamide resin soluble in an alcohol-based solvent is preferred as the polyamide resin. For example, ternary (6-66-610) copolymerized polyamide, quaternary (6-66-610-12) copolymerized polyamide, N-methoxymethylated nylon, polymerized fatty acid-based polyamide, a polymerized fatty acid-based polyamide block copolymer, and copolymerized polyamide having a diamine component are preferably used.

From the viewpoint of suppressing charge accumulation, the crystal structure of each of the titanium oxide particles is preferably a rutile type or an anatase type, and is more preferably a rutile type having weak photocatalytic activity. When the crystal structure is a rutile type, the rutilation ratio of the particles is preferably 90% or more. The shape of each of the titanium oxide particles is preferably a spherical shape, and the average primary particle diameter of the titanium oxide particles is preferably 10 to 100 nm, more preferably 30 to 60 nm from the viewpoints of the suppression of charge accumulation and uniform dispersibility.

It is preferred that the undercoat layer contain titanium oxide particles whose surfaces are treated with an organosilicon compound, and when the degree of hydrophobicity of the titanium oxide particles whose surfaces are treated with the organosilicon compound is represented by $\alpha$ [%], the $\alpha$ [%] be 10 to 70%. When the degree of hydrophobicity $\alpha$ is 10 to 70%, charge accumulation can be suppressed, and an influence of a humidity change can be reduced.

The value of the degree of hydrophobicity $\alpha$ may be determined by measuring the methanol wettability of the titanium oxide particles whose surfaces have already been treated with the organosilicon compound. The measurement of the methanol wettability is performed with, for example, a powder wettability tester (product name: WET-100P, manufactured by RHESCA Co., Ltd.) as described below.

0.2 Gram of the titanium oxide particles whose surfaces have already been treated with the organosilicon compound and 50 g of ion-exchanged water are loaded into a 200-milliliter beaker, and methanol is dropped into the flask with a burette while the mixture in the beaker is slowly stirred. When the amount of the dropped methanol when a light transmittance in the beaker becomes 10% is represented by "a", the value of the degree of hydrophobicity $\alpha$ is calculated from the equation (vii): $\alpha=100\times a/(a+50)$.

The undercoat layer may contain an additive, such as organic matter particles or a leveling agent, in addition to the foregoing for the purpose of, for example, improving the formability of the undercoat layer. However, the content of the additive in the undercoat layer is preferably 10 mass % or less with respect to the total mass of the undercoat layer.

The thickness of the undercoat layer is preferably 0.5 to 3 μm. When the thickness of the undercoat layer is 3 μm or less, the effect of suppressing the charge accumulation is highly obtained. When the thickness is 0.5 μm or more, the occurrence of leakage due to a local reduction in charging performance can be suppressed.

The undercoat layer may be formed by preparing a coating liquid for an undercoat layer containing the above-mentioned materials and a solvent, forming a coat thereof, and drying and/or curing the coat. Examples of the solvent to be used for the coating liquid include an alcohol-based solvent, a ketone-based solvent, an ether-based solvent, an ester-based solvent, and an aromatic hydrocarbon-based solvent. A dispersion method for the dispersion of the titanium oxide particles in the coating liquid for an undercoat layer is, for example, a method including using ultrasonic dispersion, a paint shaker, a sand mill, a ball mill, or a liquid collision-type high-speed disperser.

<Charge-Generating Layer>

The charge-generating layer is arranged on the undercoat layer so as to be in contact with the undercoat layer. The charge-generating layer is obtained by: dispersing a charge-generating substance and as required, a binder resin in a solvent to prepare a coating liquid for a charge-generating layer; forming a coat of the coating liquid for a charge-generating layer; and drying the coat.

The coating liquid for a charge-generating layer may be prepared as follows: only the charge-generating substance is added to the solvent, and the mixture is subjected to dispersion treatment; and then, the binder resin is added thereto. Alternatively, the coating liquid may be prepared by simultaneously adding the charge-generating substance and the binder resin to the solvent, and subjecting the mixture to dispersion treatment.

At the time of the dispersion, a medium-type disperser, such as a sand mill or a ball mill, or a disperser, such as a liquid collision-type disperser or an ultrasonic disperser, may be used.

The content of the charge-generating substance in the charge-generating layer is preferably 30 to 85 mass %, more preferably 60 to 80 mass % with respect to the total mass of the charge-generating layer.

Examples of the binder resin to be used for the charge-generating layer include resins (insulating resins), such as a polyvinyl butyral resin, a polyvinyl acetal resin, a polyarylate resin, a polycarbonate resin, a polyester resin, a polyvinyl acetate resin, a polysulfone resin, a polystyrene resin, a phenoxy resin, an acrylic resin, a phenoxy resin, a polyacrylamide resin, a polyvinylpyridine resin, a urethane resin, an agarose resin, a cellulose resin, a casein resin, a polyvinyl alcohol resin, a polyvinylpyrrolidone resin, a vinylidene chloride resin, an acrylonitrile copolymer, and a polyvinyl benzal resin. In addition, organic photoconductive polymers, such as poly-N-vinylcarbazole, polyvinylanthracene, and polyvinylpyrene, may also be used. In addition, the binder resins may be used alone or as a mixture or a copolymer thereof.

Examples of the solvent to be used for the coating liquid for a charge-generating layer include toluene, xylene, tetralin, chlorobenzene, dichloromethane, chloroform, trichloroethylene, tetrachloroethylene, carbon tetrachloride, methyl acetate, ethyl acetate, propyl acetate, methyl formate, ethyl formate, acetone, methyl ethyl ketone, cyclohexanone, diethyl ether, dipropyl ether, propylene glycol monomethyl ether, dioxane, methylal, tetrahydrofuran, water, methanol, ethanol, n-propanol, isopropanol, butanol, methyl cellosolve, methoxypropanol, dimethylformamide, dimethylacetamide, and dimethyl sulfoxide. In addition, the solvents may be used alone or as a mixture thereof.

Examples of the charge-generating substance to be used for the charge-generating layer include an azo pigment, a perylene pigment, a polycyclic quinone pigment, an indigo pigment, and a phthalocyanine pigment. Of those, a phthalocyanine pigment is preferred, and an oxytitanium phthalocyanine pigment and a hydroxygallium phthalocyanine pigment are more preferred. The oxytitanium phthalocyanine pigment and the hydroxygallium phthalocyanine pigment may each have an axial ligand or a substituent.

Further, the hydroxygallium phthalocyanine pigment preferably includes crystal particles each of which is a crystal form showing peaks at Bragg angles 2θ of 7.4°±0.3° and 28.2°±0.3° in an X-ray diffraction spectrum using a CuKα ray.

Further, the hydroxygallium phthalocyanine pigment more preferably includes crystal particles each containing, in itself, an amide compound represented by the following formula (A1).

(A1)

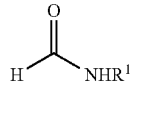

In the formula (A1), $R^1$ represents a methyl group, a propyl group, or a vinyl group.

Examples of the amide compound represented by the formula (A1) include N-methylformamide, N-propylformamide, and N-vinylformamide.

In addition, the content of the amide compound represented by the formula (A1) to be incorporated into the crystal particles is preferably 0.1 to 3.0 mass %, more preferably 0.1 to 1.4 mass % with respect to the content of the crystal particles. When the content of the amide compound represented by the formula (A1) with respect to the content of the crystal particles is 0.1 to 3.0 mass %, the sizes of the crystal particles can be aligned to an appropriate size.

The hydroxygallium phthalocyanine pigment including the crystal particles each containing the amide compound represented by the formula (A1) is obtained by a step of subjecting a phthalocyanine pigment obtained by an acid pasting method and the amide compound represented by the formula (A1) to crystal conversion through wet milling treatment.

When a dispersant is used in the milling treatment, the amount of the dispersant is preferably 10 to 50 times as large as that of the phthalocyanine pigment on a mass basis. In addition, examples of a solvent to be used in the milling treatment include: amide-based solvents, such as N,N-dimethylformamide, N,N-dimethylacetamide, the compound represented by the formula (A1), N-methylacetamide, and N-methylpropionamide; halogen-based solvents such as chloroform; ether-based solvents such as tetrahydrofuran; and sulfoxide-based solvents such as dimethyl sulfoxide. In addition, the usage amount of the solvent is preferably 5 to 30 times as large as that of the phthalocyanine pigment on a mass basis.

The fact that the hydroxygallium phthalocyanine pigment obtained through the foregoing step includes the crystal particles each containing the amide compound represented by the formula (A1) can be recognized as described below. That is, the resultant hydroxygallium phthalocyanine pigment is subjected to $^1$H-NMR measurement, and data obtained by the measurement is analyzed. In addition, the data analysis of the results of the $^1$H-NMR measurement can determine the content of the amide compound represented by the formula (A1) in the crystal particles. For example, when milling treatment, or a washing step after milling, with a solvent that can dissolve the amide compound represented by the formula (A1) is performed, the resultant hydroxygallium phthalocyanine pigment is subjected to the $^1$H-NMR measurement. When the amide compound represented by the formula (A1) is detected, it can be judged that the amide compound represented by the formula (A1) is incorporated into the crystal.

Powder X-ray diffraction measurement and $^1$H-NMR measurement of a phthalocyanine pigment to be incorporated into the electrophotographic photosensitive member may be performed under, for example, the following conditions.

(Powder X-Ray Diffraction Measurement)

Measurement device used: X-ray diffractometer RINT-TTR II, manufactured by Rigaku Corporation

- X-ray tube: Cu
- X-ray wavelength: Kα1
- Tube voltage: 50 KV
- Tube current: 300 mA
- Scanning method: 2θ scan
- Scanning speed: 4.0°/min
- Sampling interval: 0.02°
- Start angle (2θ): 5.0°

Stop angle (2θ): 35.0°
Goniometer: rotor horizontal goniometer (TTR-2)
Attachment: capillary rotating sample stage
Filter: not used
Detector: scintillation counter
Incident monochromator: used
Slit: variable slit (parallel beam method)
Counter monochromator: not used
Divergence slit: open
Divergence vertical limit slit: 10.00 mm
Scattering slit: open
Receiving slit: open ($^1$H-NMR Measurement)

Measuring instrument used: AVANCE III 500, manufactured by Bruker Corporation
Solvent: Deuterated sulfuric acid ($D_2SO_4$)
Number of scans: 2,000

The inventors of the present invention have found that when the oxytitanium phthalocyanine pigment and the hydroxygallium phthalocyanine pigment are used as the charge-generating substances, the following case occurs. That is, the contribution $S_3$ of the quantum efficiency in a change in sensitivity of the photosensitive member with a temperature and a humidity becomes negative, and the contributions $S_2$ and $S_4$ of the residual voltage and the recombination constant become positive. In general, as the temperature and humidity of the photosensitive member increase, the sensitivity of the quantum efficiency is improved, that is, the contribution $S_3$ of the quantum efficiency becomes positive. Although a reason for the mechanism via which the $S_3$ becomes negative when the oxytitanium phthalocyanine pigment and the hydroxygallium phthalocyanine pigment are used as the charge-generating substances is unclear, the inventors of the present invention have assumed the reason to be as described below.

The following causes are conceivable as a cause for an improvement in quantum efficiency and a cause for a reduction therein in an environment in which the temperature and humidity of the photosensitive member increase. Examples of the cause for the improvement in quantum efficiency include: a rise in efficiency with which an electron and a hole are separated from each other caused by a temperature increase; and an increase in relative dielectric constant of the charge-generating substance resulting from the adsorption of water to the charge-generating substance caused by a humidity increase. Meanwhile, the cause for the reduction in quantum efficiency is, for example, the weakening of a local electric field intensity of the charge-generating layer by the transfer of charge, which is present at the interface of the charge-generating layer on a side opposite to the charge-transporting layer, toward the interface of the charge-generating layer on the charge-transporting layer side caused by a humidity increase. A total improvement or reduction in quantum efficiency is determined by the magnitude of each of the two factors. When the oxytitanium phthalocyanine pigment is used, charge transfer at the interface of the charge-generating layer at the time of a humidity increase easily occurs. Accordingly, the quantum efficiency reduces at the time of increases in temperature and humidity, and hence the $S_3$ becomes negative. In addition, when the hydroxygallium phthalocyanine pigment is used, an influence of the rise in efficiency with which an electron and a hole are separated from each other caused by a temperature increase is small, and hence an influence of a reduction in local electric field intensity of the charge-generating layer caused by a humidity increase becomes relatively larger. Accordingly, the quantum efficiency reduces at the time of increases in temperature and humidity, and hence the $S_3$ becomes negative.

The inventors have assumed the reason why the $S_3$ easily becomes negative when the oxytitanium phthalocyanine pigment and the hydroxygallium phthalocyanine pigment are used to be as described above. However, even when those charge-generating substances are used, the $S_3$ does not always become negative. It is not until the combination of the substances with any layer of the electrophotographic photosensitive member other than the charge-generating layer is selected that the $S_3$ becomes negative.

<Charge-Transporting Layer>

The charge-transporting layer preferably contains the charge-transporting substance and a resin.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and an enamine compound are preferred from the viewpoint of suppressing charge accumulation in the charge-transporting layer.

The content of the charge-transporting substance in the charge-transporting layer is preferably 25 to 70 mass %, more preferably 40 to 65 mass % with respect to the total mass of the charge-transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge-transporting substance and the resin is preferably 4:10 to 20:10, more preferably 10:10 to 16:10.

In addition, the charge-transporting layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The thickness of the charge-transporting layer is 8 to 40 μm, more preferably 8 to 17 μm. When the thickness of the charge-transporting layer is set to 8 to 40 μm, the retention of charge in the charge-transporting layer can be suppressed.

The charge-transporting layer may be formed by preparing a coating liquid for a charge-transporting layer containing the above-mentioned materials and a solvent, forming a coat thereof, and drying the coat. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

<Protection Layer>

In the present invention, a protection layer may be arranged on the photosensitive layer. When the protection layer is arranged, durability can be improved.

It is preferred that the protection layer contain electroconductive particles and/or a charge-transporting substance and a resin.

Examples of the electroconductive particles include particles of metal oxides, such as titanium oxide, zinc oxide, tin oxide, and indium oxide.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred.

In addition, the protection layer may be formed as a cured film by polymerizing a composition containing a monomer having a polymerizable functional group. As a reaction in this case, there are given, for example, a thermal polymerization reaction, a photopolymerization reaction, and a radiation polymerization reaction. Examples of the polymerizable functional group of the monomer having a polymerizable functional group include an acryloyl group and a methacryloyl group. A material having a charge-transporting ability may be used as the monomer having a polymerizable functional group.

The protection layer may contain an additive, such as an antioxidant, a UV absorber, a plasticizer, a leveling agent, a slipperiness-imparting agent, or a wear resistance-improving agent. Specific examples of the additive include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The thickness of the protection layer is preferably 0.5 to 10 μm, more preferably 1 to 7 μm.

The protection layer may be formed by preparing a coating liquid for a protection layer containing the above-mentioned materials and a solvent, forming a coat thereof, and drying and/or curing the coat. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

[Process Cartridge and Electrophotographic Apparatus]

An electrophotographic apparatus according to the present invention includes an electrophotographic photosensitive member, a charging unit, an exposing unit, a developing unit, and a transferring unit.

Figure 6:
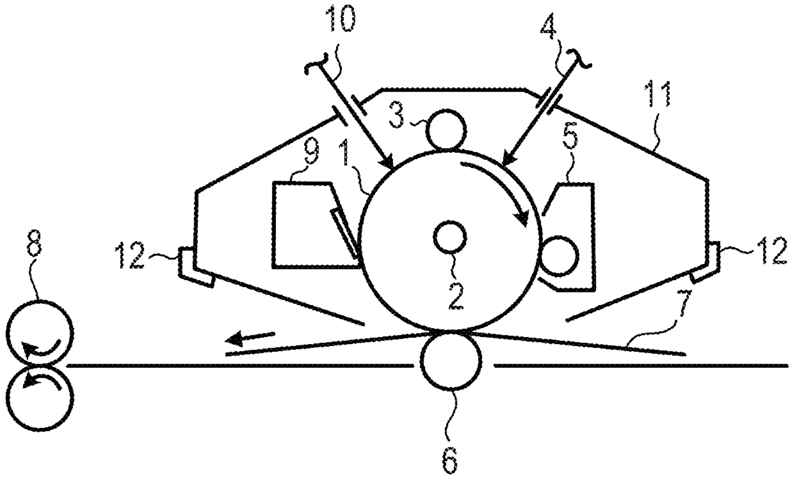
FIG. 6 is a view for illustrating an example of the schematic configuration of an electrophotographic apparatus including a process cartridge including the electrophotographic photosensitive member according to the present invention.

An example of the schematic configuration of an electrophotographic apparatus including a process cartridge including an electrophotographic photosensitive member is illustrated in FIG. 6. In FIG. 6, a cylindrical (drum-shaped) electrophotographic photosensitive member 1 is rotationally driven about a shaft 2 in a direction indicated by the arrow at a predetermined peripheral speed (process speed).

The surface of the electrophotographic photosensitive member 1 is charged to a predetermined positive or negative potential by a charging unit 3 in its rotation process. Next, exposure light 4 is applied from an exposing unit (not shown) to the charged surface of the electrophotographic photosensitive member 1 to form an electrostatic latent image corresponding to target image information. The exposure light 4 is light, which is output from the exposing unit, such as slit exposure or laser beam scanning exposure, and is subjected to intensity modulation in correspondence with a time-series electric digital image signal of the target image information.

The electrostatic latent image formed on the surface of the electrophotographic photosensitive member 1 is developed (normal development or reversal development) with toner stored in a developing unit 5 to form a toner image on the surface of the electrophotographic photosensitive member 1. The toner image formed on the surface of the electrophotographic photosensitive member 1 is transferred onto a transfer material 7 by a transferring unit 6. At this time, a bias voltage opposite in polarity to charge retained by the toner is applied from a bias power source (not shown) to the transferring unit 6. In addition, when the transfer material 7 is paper, the transfer material 7 is removed from a sheet-feeding portion (not shown), and is fed into a space between the electrophotographic photosensitive member 1 and the transferring unit 6 in sync with the rotation of the electrophotographic photosensitive member 1.

The transfer material 7 onto which the toner image has been transferred from the electrophotographic photosensitive member 1 is separated from the surface of the electrophotographic photosensitive member 1, and is then conveyed to a fixing unit 8 where the transfer material is subjected to treatment for fixing the toner image. Thus, the transfer material is printed out as an image-formed product (a print or a copy) to the outside of the electrophotographic apparatus. The surface of the electrophotographic photosensitive member 1 after the transfer of the toner image onto the transfer material 7 is cleaned by a cleaning unit 9 as follows: a deposit such as the toner (transfer residual toner) is removed from the surface. The transfer residual toner may be directly removed with a developing device or the like by a cleaner-less system that has been recently developed. Further, the surface of the electrophotographic photosensitive member 1 is subjected to electricity-removing treatment by pre-exposure light 10 from a pre-exposing unit (not shown), and is then repeatedly used in image formation. When the charging unit 3 is a contact charging unit using a charging roller or the like, the pre-exposing unit is not necessarily required.

A process cartridge according to the present invention integrally supports the above-mentioned electrophotographic photosensitive member 1, and at least one unit selected from the group consisting of: the charging unit 3; the developing unit 5; and the cleaning unit 9, and is removably mounted onto the main body of an electrophotographic apparatus. As illustrated in, for example, FIG. 6, the process cartridge according to the present invention may be a process cartridge 11 removably mounted onto the main body of the electrophotographic apparatus through use of the guiding unit 12 of the main body of the electrophotographic apparatus, such as a rail. When the electrophotographic apparatus is a copying machine or a printer, the exposure light 4 may be reflected light or transmitted light from a manuscript. Alternatively, the exposure light may be light to be radiated by, for example, scanning with a laser beam, the driving of a LED array, or the driving of a liquid crystal shutter array to be performed in accordance with a signal, which is obtained as follows: the manuscript is read with a sensor, and is turned into the signal.

The electrophotographic photosensitive member 1 according to the present invention can be widely applied to fields where electrophotography is applied, such as a laser beam printer, a CRT printer, a LED printer, a FAX, a liquid crystal printer, and laser plate making.

According to the present invention, there can be provided the electrophotographic photosensitive member that is suppressed from causing a fluctuation in tinge of an image at the time of its repeated use involving increases in temperature and humidity thereof under a low-temperature and low-humidity environment.

EXAMPLES

The present invention is described in more detail below by way of Examples and Comparative Examples. The present invention is by no means limited to the following Examples without departing from the gist of the present invention. In the description in the following Examples, “part(s)” is by mass unless otherwise specified.

The thicknesses of the respective layers of electrophotographic photosensitive members produced in Examples and Comparative Examples except a charge-generating layer were each determined by a method including using an eddy current-type thickness meter (Fischerscope, manufactured by Fischer Instruments K.K.) or a method including converting the mass of the layer per unit area into the thickness thereof through use of the specific gravity thereof.

The thickness of the charge-generating layer was measured as described below. A spectral densitometer (product name: X-Rite 504/508, manufactured by X-Rite Inc.) was pressed against the surface of any one of the photosensitive members to measure the Macbeth density value thereof. In addition, a calibration curve was obtained in advance from the value of the thickness of the layer measured by the observation of a sectional SEM image thereof. After that, the thickness of the charge-generating layer was determined by converting the Macbeth density value of the photosensitive member with the Macbeth density value and the calibration curve.

<Preparation of Coating Liquid 1 for Electroconductive Layer>

Anatase-type titanium oxide having an average of its primary particle diameters (average primary particle diameter) of 200 nm was used as a base. In addition, a titanium-niobium sulfuric acid solution containing 33.7 parts of titanium in terms of $TiO_2$ and 2.9 parts of niobium in terms of $Nb_2O_5$ was prepared.

100 Parts of the base was dispersed in pure water to provide 1,000 parts of a suspension, and the suspension was warmed to 60° C. The titanium-niobium sulfuric acid solution prepared in the foregoing and 10 mol/L sodium hydroxide were dropped into the suspension over 3 hours so that the pH of the suspension became 2 to 3. After the total amount of the solutions had been dropped, the pH was adjusted to a value near a neutral region, and a polyacrylamide-based flocculant was added to the mixture to sediment a solid content. The supernatant was removed, and the residue was filtered and washed, followed by drying at 110° C. Thus, an intermediate containing 0.1 mass % of organic matter derived from the flocculant in terms of C was obtained. The intermediate was calcined in nitrogen at 750° C. for 1 hour, and was then calcined in air at 450° C. to produce titanium oxide particles. The resultant particles had an average particle diameter (average primary particle diameter) of 220 nm in the above-mentioned particle diameter measurement method including using a scanning electron microscope.

Subsequently, 50 parts of a phenol resin serving as a binder resin was dissolved in 35 parts of a solvent to provide a solution. A phenol resin (monomer/oligomer of a phenol resin) (product name: PLYOPHEN J-325, manufactured by DIC Corporation, resin solid content: 60%, density after curing: 1.3 g/cm$^3$) was used as the phenol resin. In addition, 1-methoxy-2-propanol was used as the solvent.

60 Parts of titanium oxide particles 1 were added to the solution. The mixture was loaded into a vertical sand mill using 120 parts of glass beads having an average particle diameter of 1.0 mm as a dispersing medium, and was subjected to dispersion treatment under the conditions of a dispersion liquid temperature of 23° C.±3° C. and a number of revolutions of 1,500 rpm (peripheral speed: 5.5 m/s) for 4 hours to provide a dispersion liquid. The glass beads were removed from the dispersion liquid with a mesh. 0.01 Part of a leveling agent and 8 parts of a surface roughness-imparting material were added to the dispersion liquid after the removal of the glass beads, and the mixture was stirred. A silicone oil (product name: SH28 PAINT ADDITIVE, manufactured by Dow Corning Toray Co., Ltd.) was used as the leveling agent. In addition, silicone resin particles (product name: KMP-590, manufactured by Shin-Etsu Chemical Co., Ltd., average particle diameter: 2 μm, density: 1.3 g/cm$^3$) were used as the surface roughness-imparting material. After that, the mixture was filtered under pressure with PTFE filter paper (product name: PF060, manufactured by Advantec Toyo Kaisha, Ltd.) to prepare a coating liquid 1 for an electroconductive layer.

<Preparation of Coating Liquid 2 for Electroconductive Layer>

The following materials were prepared.

| | |
|---|---|
| Titanium oxide ($TiO_2$) particles coated with oxygen-deficient tin oxide ($SnO_2$), the particles serving as metal oxide particles | 214 parts |
| Phenol resin (monomer/oligomer of a phenol resin) (product name: PLYOPHEN J-325, manufactured by Dainippon Ink and Chemicals, Incorporated, resin solid content: 60 mass %) serving as a binder resin | 132 parts |
| 1-Methoxy-2-propanol serving as a solvent | 98 parts |

Those materials were loaded into a sand mill using 450 parts of glass beads each having a diameter of 0.8 mm, and were subjected to dispersion treatment under the conditions of a number of revolutions of 2,000 rpm, a dispersion treatment time of 4.5 hours, and a cooling water preset temperature of 18° C. to provide a dispersion liquid. The glass beads were removed from the dispersion liquid with a mesh (aperture: 150 μm). A surface roughness-imparting material was added to the dispersion liquid after the removal of the glass beads so that its content became 10 mass % with respect to the total mass of the metal oxide particles and the binder resin in the dispersion liquid. Silicone resin particles (product name: TOSPEARL 120, manufactured by Momentive Performance Materials Inc., average particle diameter: 2 μm) were used as the surface roughness-imparting material. In addition, a silicone oil (product name: SH28 PA, manufactured by Dow Corning Toray Co., Ltd.) serving as a leveling agent was added to the dispersion liquid so that its content became 0.01 mass % with respect to the total mass of the metal oxide particles and the binder resin in the dispersion liquid, followed by stirring. Thus, a coating liquid 2 for an electroconductive layer was prepared.

<Preparation of Coating Liquid 3 for Electroconductive Layer>

The following materials were prepared.

| | |
|---|---|
| Carbon black (product name: VXC72, manufactured by Cabot Corporation) | 10 parts |
| Blocked isocyanate (product name: Sumidur BL3175, manufactured by Sumitomo Bayer Urethane Co., Ltd.) | 47 parts |
| Butyral resin (product name: 5-LEC BM-1, manufactured by Sekisui Chemical Co., Ltd.) | 81 parts |
| Methyl ethyl ketone | 90 parts |

Those materials were mixed to provide a dispersion liquid. 38 Parts of the dispersion liquid and 30 parts of methyl ethyl ketone were mixed, and the mixture was subjected to dispersion treatment in a vertical sand mill using glass beads each having a diameter of 1.0 mm for 90 minutes. After that, 0.05 part of dioctyltin dilaurate was added as a catalyst to the dispersion liquid from which the glass beads had been removed. Thus, a coating liquid 3 for an electroconductive layer was prepared.

<Preparation of Coating Liquid 1 for Undercoat Layer>

100 Parts of rutile-type titanium oxide particles (average primary particle diameter: 50 nm, manufactured by Tayca Corporation) were stirred and mixed with 400 parts of methanol and 100 parts of methyl ethyl ketone, and 3.5 parts of vinyltrimethoxysilane was added to the mixture. After that, the mixture was subjected to dispersion treatment in a vertical sand mill using glass beads each having a diameter of 1.0 mm for 8 hours. After the glass beads had been removed, methanol and methyl ethyl ketone were evaporated by distillation under reduced pressure, and the residue was dried for 3 hours at 120° C. Thus, rutile-type titanium oxide particles whose surfaces had already been treated with the organosilicon compound were obtained.

Subsequently, the following materials were prepared.

| | |
|---|---|
| Rutile-type titanium oxide particles whose surfaces have already been treated with the organosilicon compound obtained in the foregoing | 18.0 parts |
| N-methoxymethylated nylon (product name: TORESIN EF-30T, manufactured by Nagase ChemteX Corporation) | 4.5 parts |
| Copolymerized nylon resin (product name: AMILAN CM8000, manufactured by Toray Industries, Inc.) | 1.5 parts |

Those materials were added to a mixed solvent of 90 parts of methanol and 60 parts of 1-butanol to prepare a dispersion liquid. The dispersion liquid was subjected to dispersion treatment in a vertical sand mill using glass beads each having a diameter of 1.0 mm for 5 hours, and the glass beads were removed. Thus, a coating liquid 1 for an undercoat layer was prepared.

<Preparation of Coating Liquid 2 for Undercoat Layer>

In the preparation of the coating liquid 1 for an undercoat layer, the usage amount of vinyltrimethoxysilane in the production of the rutile-type titanium oxide particles whose surfaces had already been treated with the organosilicon compound was changed from 3.5 parts to 1.8 parts. A coating liquid 2 for an undercoat layer was prepared in the same manner as in the coating liquid 1 for an undercoat layer except the foregoing.

<Preparation of Coating Liquid 3 for Undercoat Layer>

In the preparation of the coating liquid 1 for an undercoat layer, the usage amount of vinyltrimethoxysilane in the production of the rutile-type titanium oxide particles whose surfaces had already been treated with the organosilicon compound was changed from 3.5 parts to 2.0 parts. A coating liquid 3 for an undercoat layer was prepared in the same manner as in the coating liquid 1 for an undercoat layer except the foregoing.

<Preparation of Coating Liquid 4 for Undercoat Layer>

In the preparation of the coating liquid 1 for an undercoat layer, the usage amount of vinyltrimethoxysilane in the production of the rutile-type titanium oxide particles whose surfaces had already been treated with the organosilicon compound was changed from 3.5 parts to 3.0 parts. A coating liquid 4 for an undercoat layer was prepared in the same manner as in the coating liquid 1 for an undercoat layer except the foregoing.

<Preparation of Coating Liquid 5 for Undercoat Layer>

In the preparation of the coating liquid 1 for an undercoat layer, the usage amount of vinyltrimethoxysilane in the production of the rutile-type titanium oxide particles whose surfaces had already been treated with the organosilicon compound was changed from 3.5 parts to 5.0 parts. A coating liquid 5 for an undercoat layer was prepared in the same manner as in the coating liquid 1 for an undercoat layer except the foregoing.

<Preparation of Coating Liquid 6 for Undercoat Layer>

A coating liquid 6 for an undercoat layer was prepared in the same manner as in the coating liquid 1 for an undercoat layer except that in the preparation of the coating liquid 1 for an undercoat layer, the method of producing the rutile-type titanium oxide particles whose surfaces had already been treated with the organosilicon compound was changed as described below.

100 Parts of rutile-type titanium oxide particles (average primary particle diameter: 50 nm, manufactured by Tayca Corporation) were stirred and mixed with 500 parts of toluene, and 6.0 parts of n-propyltrimethoxysilane was added to the mixture, followed by stirring with a stirring machine for 8 hours. After that, toluene was evaporated by distillation under reduced pressure, and the residue was dried for 3 hours at 120° C. Thus, rutile-type titanium oxide particles whose surfaces had already been treated with the organosilicon compound were obtained.

<Preparation of Coating Liquid 7 for Undercoat Layer>

100 Parts of rutile-type titanium oxide particles (average primary particle diameter: 15 nm, manufactured by Tayca Corporation) were stirred and mixed with 500 parts of toluene, and 10.0 parts of isobutyltrimethoxysilane was added to the mixture, followed by stirring with a stirring machine for 8 hours. After that, toluene was evaporated by distillation under reduced pressure, and the residue was dried for 3 hours at 120° C. Thus, rutile-type titanium oxide particles whose surfaces had already been treated with the organosilicon compound were obtained.

Subsequently, the following materials were prepared.

| | |
|---|---|
| Rutile-type titanium oxide particles whose surfaces have already been treated with the organosilicon compound obtained in the foregoing | 12.0 parts |
| N-methoxymethylated nylon (product name: TORESIN EF-30T, manufactured by Nagase ChemteX Corporation) | 6.0 parts |
| Copolymerized nylon resin (product name: AMILAN CM8000, manufactured by Toray Industries, Inc.) | 3.0 parts |

Those materials were added to a mixed solvent of 90 parts of methanol and 60 parts of 1-butanol to prepare a dispersion liquid. The dispersion liquid was subjected to dispersion treatment in a vertical sand mill using glass beads each having a diameter of 1.0 mm for 5 hours, and the glass beads were removed. Thus, a coating liquid 7 for an undercoat layer was prepared.

<Preparation of Coating Liquid 8 for Undercoat Layer>

In the preparation of the coating liquid 7 for an undercoat layer, the usage amount of isobutyltrimethoxysilane in the production of the rutile-type titanium oxide particles whose surfaces had already been treated with the organosilicon compound was changed from 10.0 parts to 12.0 parts. A coating liquid 8 for an undercoat layer was prepared in the same manner as in the coating liquid 7 for an undercoat layer except the foregoing.

<Preparation of Coating Liquid 9 for Undercoat Layer>

In the preparation of the coating liquid 7 for an undercoat layer, the usage amount of isobutyltrimethoxysilane in the production of the rutile-type titanium oxide particles whose surfaces had already been treated with the organosilicon compound was changed from 10.0 parts to 14.0 parts. A coating liquid 9 for an undercoat layer was prepared in the same manner as in the coating liquid 7 for an undercoat layer except the foregoing.

<Preparation of Coating Liquid 10 for Undercoat Layer>

100 Parts of rutile-type titanium oxide particles (average primary particle diameter: 40 nm, manufactured by Ishihara Sangyo Kaisha, Ltd.) were stirred and mixed with 400 parts of methanol and 100 parts of methyl ethyl ketone, and 3 parts of methyldimethoxysilane was added to the mixture. After that, the mixture was subjected to dispersion treatment in a vertical sand mill using glass beads each having a diameter of 1.0 mm for 8 hours. After the glass beads had been removed, methanol and methyl ethyl ketone were evaporated by distillation under reduced pressure, and the residue was dried for 3 hours at 120° C. Thus, rutile-type titanium oxide particles whose surfaces had already been treated with the organosilicon compound were obtained.

Subsequently, the following materials were prepared.

| | |
|---|---|
| Rutile-type titanium oxide particles whose surfaces have already been treated with the organosilicon compound obtained in the foregoing | 15.0 parts |
| Copolymerized polyamide having a composition molar ratio of ε-caprolactam/bis(4-amino-3-methylcyclohexyl)methane/hexamethylenediamine/decamethylenedicarboxylic acid/octadecamethylenedicarboxylic acid of 60%/15%/5%/15%/5% | 5.0 parts |

Those materials were added to a mixed solvent of 56 parts of methanol, 8 parts of 1-propanol, and 16 parts of toluene to prepare a dispersion liquid. The dispersion liquid was subjected to dispersion treatment in a vertical sand mill using glass beads each having a diameter of 1.0 mm for 5 hours, and the glass beads were removed. Thus, a coating liquid 10 for an undercoat layer was prepared.

<Preparation of Coating Liquid 11 for Undercoat Layer>

7 Parts by weight of titanium oxide particles (average primary particle diameter: 20 nm, manufactured by Ishihara Sangyo Kaisha, Ltd.: TTO-55A) and 13 parts by weight of copolymerized nylon (manufactured by Toray Industries, Inc.: CM8000) were added to a mixed solvent of 159 parts by weight of methyl alcohol and 106 parts by weight of 1,3-dioxolane to prepare a dispersion liquid. The dispersion liquid was subjected to dispersion treatment in a vertical sand mill using glass beads each having a diameter of 1.0 mm for 8 hours, and the glass beads were removed. Thus, a coating liquid 11 for an undercoat layer was prepared.

<Preparation of Coating Liquid 12 for Undercoat Layer>

4.5 Parts of N-methoxymethylated nylon (product name: TORESIN EF-30T, manufactured by Nagase ChemteX Corporation) and 1.5 parts of a copolymerized nylon resin (product name: AMILAN CM8000, manufactured by Toray Industries, Inc.) were added to a mixed solvent of 90 parts of methanol and 45 parts of 1-butanol. After that, the mixture was stirred at 40° C. for 2 hours to prepare a coating liquid 12 for an undercoat layer.

<Preparation of Coating Liquid 1 for Charge-generating Layer>

In 100 g of α-chloronaphthalene, 5.0 g of o-phthalodinitrile and 2.0 g of titanium tetrachloride were heated and stirred at 200° C. for 3 hours, and were then cooled to 50° C. to precipitate a crystal. The crystal was separated by filtration to provide a paste of dichlorotitanium phthalocyanine. Next, the resultant paste was stirred and washed with 100 mL of N,N-dimethylformamide heated to 100° C., and was then washed repeatedly twice with 100 mL of methanol at 60° C. and separated by filtration. Further, the resultant paste was stirred at 80° C. for 1 hour in 100 mL of deionized water, and was separated by filtration to provide 4.3 g of a blue oxytitanium phthalocyanine pigment.

Next, the pigment was dissolved in 30 mL of concentrated sulfuric acid. The solution was dropped into 300 mL of deionized water at 20° C. under stirring to be reprecipitated. The resultant was filtered and sufficiently washed with water to provide an amorphous oxytitanium phthalocyanine pigment. 4.0 Grams of the amorphous oxytitanium phthalocyanine pigment was suspended and stirred in 100 mL of methanol at room temperature (22° C.) for 8 hours. The resultant was separated by filtration and dried under reduced pressure to provide an oxytitanium phthalocyanine pigment having low crystallinity.

0.5 Part of the oxytitanium phthalocyanine pigment obtained in the foregoing was mixed with 10 parts of tetrahydrofuran, 15 parts of glass beads each having a diameter of 0.9 mm were further added to the mixture, and the resultant was subjected to milling treatment at room temperature (23° C.) for 1,200 hours through use of a ball mill. At this time, the treatment was performed through use of, as a container, a standard bottle (product name: PS-6, manufactured by Hakuyo Glass Co., Ltd.) under such a condition that the container was rotated 120 times per minute. The liquid subjected to the milling treatment as described above was filtered with a filter (item number: N-NO. 125T, pore diameter: 133 μm, manufactured by NBC Meshtec Inc.) to remove the glass beads. 30 Parts of tetrahydrofuran was added to the liquid subjected to the filter treatment. After that, the mixture was further filtered, and a filtration residue on a filter unit was sufficiently washed with methanol and water. Then, the washed filtration residue was dried in a vacuum to provide 0.44 part of an oxytitanium phthalocyanine pigment.

The resultant pigment had a peak at a Bragg angle (2θ) of 27.2°±0.2° in an X-ray diffraction spectrum using a CuKα ray.

Subsequently, the following materials were prepared.

| | |
|---|---|
| Oxytitanium phthalocyanine pigment obtained in the milling treatment | 14 parts |
| Polyvinyl butyral (product name: S-LEC BX-1, manufactured by Sekisui Chemical Co., Ltd.) | 7 parts |
| Cyclohexanone | 139 parts |
| Glass beads each having a diameter of 0.9 mm | 354 parts |

Those materials were subjected to dispersion treatment with a sand mill (K-800, manufactured by Igarashi Machine Production Co., Ltd. (currently changed to Aimex Co., Ltd.), disc diameter: 70 mm, number of discs: 5) under a cooling water temperature of 18° C. for 4 hours. At this time, the treatment was performed under such a condition that the discs were rotated 1,800 times per minute. 326 Parts of cyclohexanone and 465 parts of ethyl acetate were added to the dispersion liquid to prepare a coating liquid 1 for a charge-generating layer.

<Preparation of Coating Liquid 2 for Charge-Generating Layer>

Under a nitrogen flow atmosphere, 5.46 parts of orthophthalonitrile and 45 parts of α-chloronaphthalene were loaded into a reaction vessel. After that, the temperature of the mixture was increased to 30° C. by its heating, and the temperature was maintained. Next, 3.75 parts of gallium trichloride was loaded into the vessel at the temperature (30° C.). The moisture concentration of the mixed liquid at the time of the loading was 150 ppm. After that, the temperature was increased to 200° C. Next, under a nitrogen flow atmosphere, the resultant was subjected to a reaction at a temperature of 200° C. for 4.5 hours, and was then cooled. When the temperature reached 150° C., the product was filtered. The resultant filtration residue was dispersed in and washed with N,N-dimethylformamide at a temperature of 140° C. for 2 hours, and was then filtered. The resultant filtration residue was washed with methanol, and was then dried to provide a chlorogallium phthalocyanine pigment in a yield of 71%.

4.65 Parts of the chlorogallium phthalocyanine pigment obtained in the foregoing was dissolved in 139.5 parts of concentrated sulfuric acid at a temperature of 10° C. The solution was dropped into 620 parts of ice water under stirring to be reprecipitated. After that, the precipitate was filtered under reduced pressure with a filter press. At this time, No. 5C (manufactured by Advantec) was used as a filter. The resultant wet cake (filtration residue) was dispersed in and washed with 2% ammonia water for 30 minutes, and was then filtered with the filter press. Next, the resultant wet cake (filtration residue) was dispersed in and washed with ion-exchanged water, and was then repeatedly filtered with the filter press three times. Finally, the resultant was freeze-dried to provide a hydroxygallium phthalocyanine pigment (water-containing hydroxygallium phthalocyanine pigment) having a solid content of 23% in a yield of 97%.

6.6 Kilograms of the hydroxygallium phthalocyanine pigment was dried with a hyper-dry dryer (product name: HD-06R, frequency (oscillation frequency): 2,455 MHz±15 MHz, manufactured by Biocon (Japan) Ltd.) as described below.

The hydroxygallium phthalocyanine pigment was placed under the state of a lump (water-containing cake thickness: 4 cm or less) immediately after its removal from the filter press on a dedicated circular plastic tray, and the dryer was set so that far infrared rays were turned off, and the temperature of the inner wall of the dryer became 50° C. Then, when the pigment was irradiated with a microwave, the vacuum pump and leak valve of the dryer were adjusted to adjust the vacuum degree thereof to 4.0 to 10.0 kPa.

First, as a first step, the hydroxygallium phthalocyanine pigment was irradiated with a microwave having an output of 4.8 kW for 50 minutes. Next, the microwave was temporarily turned off, and the leak valve was temporarily closed to achieve a high vacuum of 2 kPa or less. The solid content of the hydroxygallium phthalocyanine pigment at this time point was 88%.

As a second step, the leak valve was adjusted to adjust the vacuum degree (pressure in the dryer) within the above-mentioned preset values (4.0 to 10.0 kPa). After that, the hydroxygallium phthalocyanine pigment was irradiated with a microwave having an output of 1.2 kW for 5 minutes. In addition, the microwave was temporarily turned off, and the leak valve was temporarily closed to achieve a high vacuum of 2 kPa or less. The second step was repeated once more (twice in total). The solid content of the hydroxygallium phthalocyanine pigment at this time point was 98%.

Further, as a third step, microwave irradiation was performed in the same manner as in the second step except that the output of the microwave in the second step was changed from 1.2 kW to 0.8 kW. The third step was repeated once more (twice in total).

Further, as a fourth step, the leak valve was adjusted to return the vacuum degree (pressure in the dryer) within the above-mentioned preset values (4.0 to 10.0 kPa). After that, the hydroxygallium phthalocyanine pigment was irradiated with a microwave having an output of 0.4 kW for 3 minutes. In addition, the microwave was temporarily turned off, and the leak valve was temporarily closed to achieve a high vacuum of 2 kPa or less. The fourth step was repeated seven more times (eight times in total).

Thus, 1.52 kg of a hydroxygallium phthalocyanine pigment (crystal) having a water content of 1% or less was obtained within a total of 3 hours.

Subsequently, the following materials were prepared.

| | |
|---|---|
| Hydroxygallium phthalocyanine pigment (crystal) obtained in the foregoing | 0.5 part |
| N-methylformamide (product code: F0059, manufactured by Tokyo Chemical Industry Co., Ltd.) | 9.5 parts |
| Glass beads each having a diameter of 0.9 mm | 15 parts |

Those materials were subjected to milling treatment at room temperature (23° C.) for 1,200 hours through use of a ball mill. At this time, the treatment was performed through use of, as a container, a standard bottle (product name: PS-6, manufactured by Hakuyo Glass Co., Ltd.) under such a condition that the container was rotated 120 times per minute. The liquid subjected to the milling treatment was filtered with a filter (item number: N-NO. 125T, pore diameter: 133 μm, manufactured by NBC Meshtec Inc.) to remove the glass beads. 30 Parts of N-methylformamide was added to this liquid. After that, the mixture was filtered, and a filtration residue on a filter unit was sufficiently washed with tetrahydrofuran. Then, the washed filtration residue was dried in a vacuum to provide 0.46 part of a hydroxygallium phthalocyanine pigment.

The resultant hydroxygallium phthalocyanine pigment had peaks at Bragg angles (2θ°) of 7.5°+0.2°, 9.9°+0.2°, 16.2°+0.2°, 18.6°+0.2°, 25.2°+0.2°, and 28.3°+0.2° in an X-ray diffraction spectrum using a CuKα ray.

In addition, the content of an amide compound (N-methylformamide) represented by the formula (A1) in the hydroxygallium phthalocyanine crystal particles, which was estimated by $^1$H-NMR measurement, was 1.9 mass % with respect to the content of the hydroxygallium phthalocyanine.

Subsequently, the following materials were prepared.

| | |
|---|---|
| Hydroxygallium phthalocyanine pigment obtained in the milling treatment | 20 parts |
| Polyvinyl butyral (product name: S-LEC BX-1, manufactured by Sekisui Chemical Co., Ltd.) | 10 parts |
| Cyclohexanone | 190 parts |
| Glass beads each having a diameter of 0.9 mm | 482 parts |

Those materials were subjected to dispersion treatment with a sand mill (K-800, manufactured by Igarashi Machine Production Co., Ltd. (currently changed to Aimex Co., Ltd.), disc diameter: 70 mm, number of discs: 5) under a cooling water temperature of 18° C. for 4 hours. At this time, the treatment was performed under such a condition that the discs were rotated 1,800 times per minute. 444 Parts of cyclohexanone and 634 parts of ethyl acetate were added to the dispersion liquid to prepare a coating liquid 2 for a charge-generating layer.

<Coating Liquid 1 for Charge-Transporting Layer>

The following materials were prepared.

| | |
|---|---|
| Triarylamine compound represented by the following formula (CTM-1), the compound serving as a charge-transporting substance | 5 parts |
| Triarylamine compound represented by the following formula (CTM-2) | 5 parts |
| Polycarbonate (product name: IUPILON Z-400, manufactured by Mitsubishi Engineering-Plastics Corporation) | 10 parts |

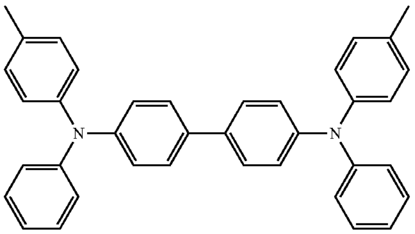

(CTM-1)

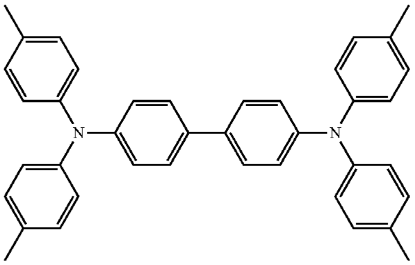

(CTM-2)

Those materials were dissolved in a mixed solvent of 25 parts of orthoxylene, 25 parts of methyl benzoate, and 25 parts of dimethoxymethane to prepare a coating liquid 1 for a charge-transporting layer.

<Coating Liquid 2 for Charge-Transporting Layer>

The following materials were prepared.

| | |
|---|---|
| Enamine compound represented by the following formula (CTM-3), the compound serving as a charge-transporting substance | 10 parts |
| Polycarbonate (product name: IUPILON Z-400, manufactured by Mitsubishi Engineering-Plastics Corporation) | 10 parts |

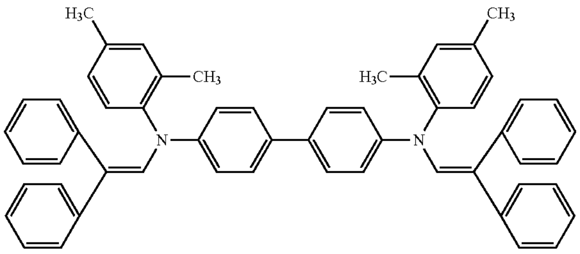

(CTM-3)

Those materials were dissolved in a mixed solvent of 60 parts of tetrahydrofuran and 15 parts of toluene to prepare a coating liquid 2 for a charge-transporting layer.

<Coating Liquid 3 for Charge-Transporting Layer>

In the preparation of the coating liquid 2 for a charge-transporting layer, 10 parts of an enamine compound represented by the following formula (CTM-4) was used instead of using 10 parts of the enamine compound represented by the formula (CTM-3). A coating liquid 3 for a charge-transporting layer was prepared in the same manner as in the coating liquid 2 for a charge-transporting layer except the foregoing.

(CTM-4)

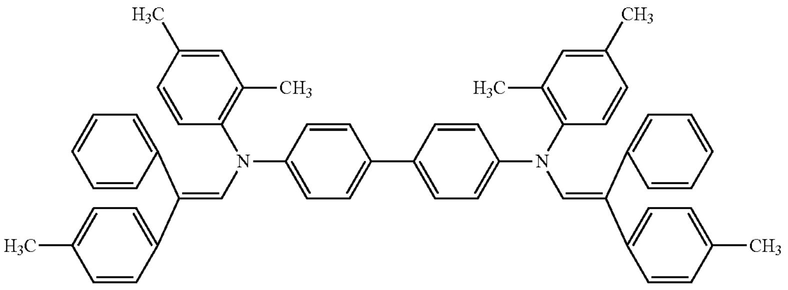

<Coating Liquid 4 for Charge-Transporting Layer>

In the preparation of the coating liquid 2 for a charge-transporting layer, 10 parts of a triarylamine compound represented by the following formula (CTM-5) was used instead of using 10 parts of the enamine compound represented by the formula (CTM-3). A coating liquid 4 for a charge-transporting layer was prepared in the same manner as in the coating liquid 2 for a charge-transporting layer except the foregoing.

(CTM-5)

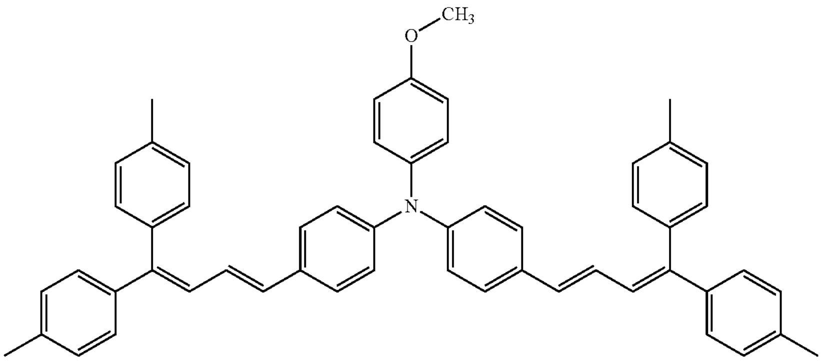

<Coating Liquid 5 for Charge-Transporting Layer>

In the preparation of the coating liquid 1 for a charge-transporting layer, the usage amount of the triarylamine compound represented by the formula (CTM-1) was changed from 5 parts to 6 parts, and the usage amount of the triarylamine compound represented by the formula (CTM-2) was changed from 5 parts to 6 parts. A coating liquid 5 for a charge-transporting layer was prepared in the same manner as in the coating liquid 1 for a charge-transporting layer except the foregoing.

<Coating Liquid 6 for Charge-Transporting Layer>

In the preparation of the coating liquid 1 for a charge-transporting layer, the usage amount of the triarylamine compound represented by the formula (CTM-1) was changed from 5 parts to 6.5 parts, and the usage amount of the triarylamine compound represented by the formula (CTM-2) was changed from 5 parts to 6.5 parts. A coating liquid 6 for a charge-transporting layer was prepared in the same manner as in the coating liquid 1 for a charge-transporting layer except the foregoing.

<Coating Liquid 7 for Charge-Transporting Layer>

In the preparation of the coating liquid 1 for a charge-transporting layer, the usage amount of the triarylamine compound represented by the formula (CTM-1) was changed from 5 parts to 8 parts, and the usage amount of the triarylamine compound represented by the formula (CTM-2) was changed from 5 parts to 8 parts. A coating liquid 7 for a charge-transporting layer was prepared in the same manner as in the coating liquid 1 for a charge-transporting layer except the foregoing.

<Coating Liquid 8 for Charge-Transporting Layer>

In the preparation of the coating liquid 2 for a charge-transporting layer, 10 parts of a compound represented by the following formula (CTM-6) was used instead of using 10 parts of the enamine compound represented by the formula (CTM-3). A coating liquid 8 for a charge-transporting layer was prepared in the same manner as in the coating liquid 2 for a charge-transporting layer except the foregoing.

(CTM-6)

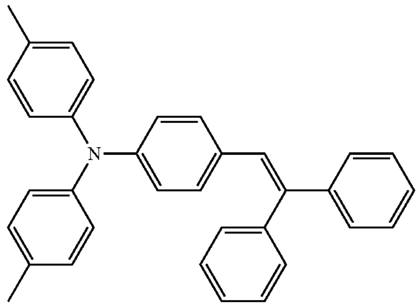

<Coating Liquid 9 for Charge-Transporting Layer>

In the preparation of the coating liquid 2 for a charge-transporting layer, 10 parts of a compound represented by the following formula (CTM-7) was used instead of using 10 parts of the enamine compound represented by the formula (CTM-3). A coating liquid 9 for a charge-transporting layer was prepared in the same manner as in the coating liquid 2 for a charge-transporting layer except the foregoing.

(CTM-7)

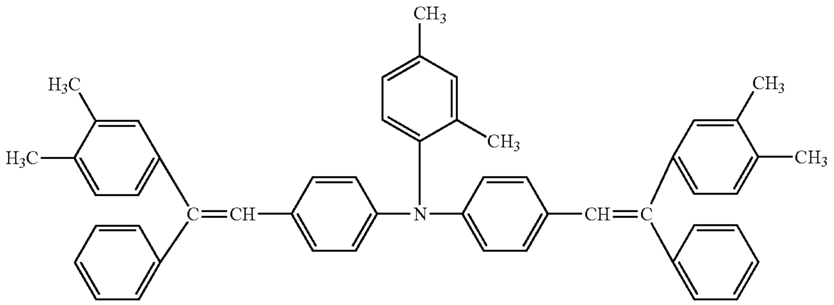

<Coating Liquid 10 for Charge-Transporting Layer>

In the preparation of the coating liquid 8 for a charge-transporting layer, the usage amount of the compound represented by the formula (CTM-6) was changed from 10 parts to 16 parts. A coating liquid 10 for a charge-transporting layer was prepared in the same manner as in the coating liquid 8 for a charge-transporting layer except the foregoing.

<Coating Liquid 1 for Protection Layer>

24 Parts of a compound represented by the following formula (4-1) and 0.1 part of a siloxane-modified acrylic compound (SYMAC US-270, manufactured by Toagosei Co., Ltd.) were mixed with a mixed solvent of 42 parts of cyclohexane and 18 parts of 1-propanol, and the mixture was stirred to prepare a coating liquid 1 for a protection layer.

(4-1)

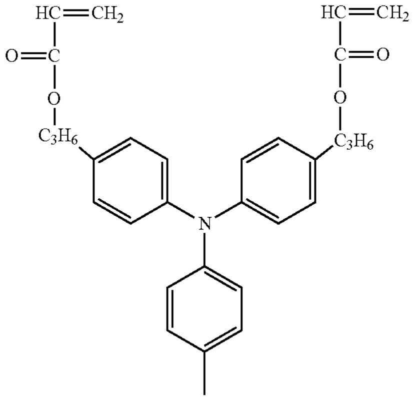

Production of Electrophotographic Photosensitive Member

Example 1

<Support>

An aluminum cylinder having a diameter of 24 mm and a length of 257 mm was used as a support (cylindrical support).

<Electroconductive Layer>

The coating liquid 1 for an electroconductive layer was applied onto the above-mentioned support by dip coating to form a coat, and the coat was cured by heating at 150° C. for 30 minutes to form an electroconductive layer having a thickness of 25 μm.

<Undercoat Layer>

The coating liquid 1 for an undercoat layer was applied onto the above-mentioned electroconductive layer by dip coating to form a coat, and the coat was cured by heating at 100° C. for 10 minutes to form an undercoat layer having a thickness of 1.7 μm.

<Charge-Generating Layer>

The coating liquid 1 for a charge-generating layer was applied onto the above-mentioned undercoat layer by dip coating to form a coat, and the coat was dried by heating at a temperature of 100° C. for 10 minutes to form a charge-generating layer having a thickness of 0.20 μm.

<Charge-Transporting Layer>

The coating liquid 1 for a charge-transporting layer was applied onto the above-mentioned charge-generating layer by dip coating to form a coat, and the coat was dried by heating at a temperature of 120° C. for 30 minutes to form a charge-transporting layer having a thickness of 15 μm.

<Protection Layer>

The coating liquid 1 for a protection layer was applied onto the charge-transporting layer by dip coating to form a coat, and the resultant coat was dried for 4 minutes at 35° C. After that, under a nitrogen atmosphere, the coat was irradiated with electron beams for 4.8 seconds under the conditions of an acceleration voltage of 57 kV and a beam current of 5.3 mA while a distance between the support (irradiation target body) and an electron beam irradiation window was set to 25 mm, and the support (irradiation target body) was rotated at a speed of 300 rpm. The absorbed dose of the electron beams at this time was measured to be 20 kGy. After that, under the nitrogen atmosphere, the temperature of air surrounding the coat was increased from 25° C. to 137° C. over 10 seconds to perform the heating of the coat. An oxygen concentration during a time period from the electron beam irradiation to the subsequent heating treatment was 10 ppm or less. Next, in the air, the coat was naturally cooled until its temperature became 25° C., and heating treatment was performed for 10 minutes under such a condition that the temperature of the coat became 100° C. Thus, a protection layer having a thickness of 1.9 μm was formed.

Examples 2 to 62

In Example 1, the kind of the coating liquid for an electroconductive layer and the thickness of the electroconductive layer, the kind of the coating liquid for an undercoat layer and the thickness of the undercoat layer, the kind of the coating liquid for a charge-generating layer and the thickness of the charge-generating layer, and the kind of the coating liquid for a charge-transporting layer and the thickness of the charge-transporting layer were changed as shown in Table 1. Electrophotographic photosensitive members according to Examples 2 to 62 were each produced in the same manner as in Example 1 except the foregoing. However, in each of Examples 43 to 50, 59, and 60, no electroconductive layer was formed, and the undercoat layer was formed on the support, and in each of Examples 3 to 60, no protection layer was formed.

Comparative Examples 1 to 10

In Example 1, the kind of the coating liquid for an undercoat layer and the thickness of the undercoat layer, the kind of the coating liquid for a charge-generating layer and the thickness of the charge-generating layer, and the kind of the coating liquid for a charge-transporting layer and the thickness of the charge-transporting layer were changed as shown in Table 2. Electrophotographic photosensitive members according to Comparative Examples 1 to 10 were each produced in the same manner as in Example 1 except the foregoing. However, in each of Comparative Examples 1 to 10, no electroconductive layer was formed, and the undercoat layer was formed on the support, and no protection layer was formed.

Comparative Example 11

<Support>

The surface of an aluminum cylinder having a diameter of 24 mm and a length of 257 mm was subjected to anodization treatment, and was then subjected to sealing treatment with a sealer containing nickel acetate as a main component so that an anodized coating film having a thickness of 6.0 μm was formed thereon. Thus, a support (cylindrical support) was obtained.

<Charge-Generating Layer>

The coating liquid 1 for a charge-generating layer was applied onto the support obtained in the foregoing by dip coating to form a coat, and the coat was dried by heating at a temperature of 100° C. for 10 minutes to form a charge-generating layer having a thickness of 0.40 μm.

<Charge-Transporting Layer>

The following materials were prepared.

| | |
|---|---|
| Compound represented by the following formula (CTM-8), the compound serving as a charge-transporting substance | 5 parts |
| Polycarbonate having a repeating structure represented by the following formula (B-1)(viscosity-average molecular weight: about 30,000) | 10 parts |

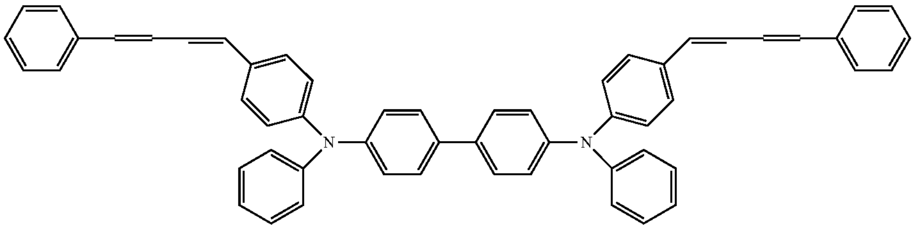

(CTM-8)

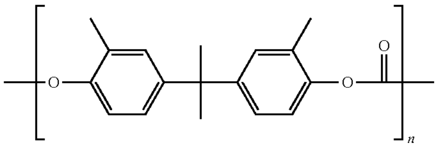

(B-1)

Those materials were dissolved in a mixed solvent of 50 parts of tetrahydrofuran and 15 parts of toluene to prepare a coating liquid for a charge-transporting layer.

The coating liquid for a charge-transporting layer prepared in the foregoing was applied onto the charge-generating layer formed in the foregoing by dip coating to form a coat, and the coat was dried by heating at a temperature of 120° C. for 30 minutes to form a charge-transporting layer having a thickness of 18 μm.

Comparative Example 12

<Support>

An aluminum cylinder having a diameter of 24 mm and a length of 257 mm was used as a support (cylindrical support).

<Undercoat Layer>

The following materials were prepared.

| | |
|---|---|
| Acetylacetone zirconium butoxide | 20 parts |
| γ-Aminopropylethoxysilane | 2 parts |
| Polyvinyl butyral resin (product name: S-LEC BM-S, manufactured by Sekisui Chemical Co., Ltd.) | 1.5 parts |

Those materials were dissolved in 70 parts of n-butyl alcohol to prepare a coating liquid for an undercoat layer.

The coating liquid for an undercoat layer prepared in the foregoing was applied onto the above-mentioned support by dip coating to form a coat, and the coat was dried by heating at a temperature of 150° C. for 10 minutes to form an undercoat layer having a thickness of 0.9 μm.

<Charge-Generating Layer>

5 Parts of X-type metal-free phthalocyanine, 5 parts of a vinyl chloride-vinyl acetate copolymer (product name: VMCH, manufactured by Union Carbide Corporation), and 200 parts of n-butyl acetate were subjected to dispersion treatment in a vertical sand mill using glass beads each having a diameter of 1.0 mm for 2 hours. After that, the glass beads were removed. Thus, a coating liquid for a charge-generating layer was prepared. The coating liquid for a charge-generating layer was applied onto the undercoat layer formed in the foregoing by dip coating, and the resultant coat was dried for 10 minutes at 100° C. to form a charge-generating layer having a thickness of 0.20 μm.

<Charge-Transporting Layer>

The coating liquid 8 for a charge-transporting layer was applied onto the charge-generating layer formed in the foregoing by dip coating to form a coat, and the coat was dried by heating at a temperature of 120° C. for 30 minutes to form a charge-transporting layer having a thickness of 24 μm.

Comparative Example 13

<Support>

An aluminum cylinder having a diameter of 24 mm and a length of 257 mm was used as a support (cylindrical support).

<Undercoat Layer>

Mixed powder of 50 parts of titanium oxide particles (average primary particle diameter: 25 nm, manufactured by Nippon Aerosil Co., Ltd.: P25) and 50 parts of titanium oxide particles (average primary particle diameter: 300 nm, manufactured by Fuji Titanium Industry Co., Ltd.: TAF-300J) was prepared. The surface of the mixed powder was mechanochemically treated with 5 parts of γ-aminopropyltriethoxysilane by a gas phase method so that γ-aminopropyltriethoxysilane was bonded thereto. The resultant was subjected to washing treatment with pure water, and was dried. After that, the resultant product was dispersed in a mixed solvent of 200 parts of methanol, 500 parts of methylene chloride, and 200 parts of butanol together with 50 parts of a copolymerized nylon resin (product name: AMILAN CM8000, manufactured by Toray Industries, Inc.) to prepare a coating liquid for an undercoat layer.

The coating liquid for an undercoat layer prepared in the foregoing was applied onto the above-mentioned support by dip coating, and the resultant coat was dried for 20 minutes at 140° C. to form an undercoat layer having a thickness of 1.5 μm.

<Charge-Generating Layer>

The coating liquid 1 for a charge-generating layer was applied onto the undercoat layer formed in the foregoing by dip coating to form a coat, and the coat was dried by heating at a temperature of 100° C. for 10 minutes to form a charge-generating layer having a thickness of 0.30 μm.

<Charge-Transporting Layer>

The following materials were prepared.

| | |
|---|---|
| Compound represented by the following formula (CTM-9), the compound serving as a charge-transporting substance | 10 parts |
| Polycarbonate having a repeating structure represented by the following formula (B-2)(viscosity-average molecular weight: about 30,000) | 10 parts |

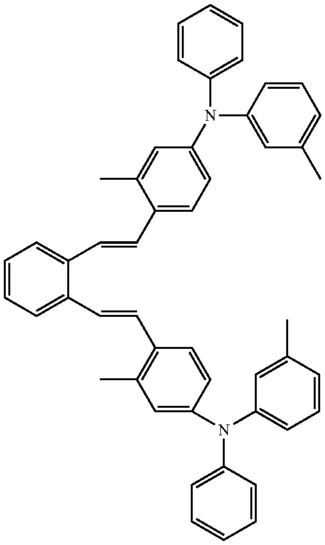

(CTM-9)

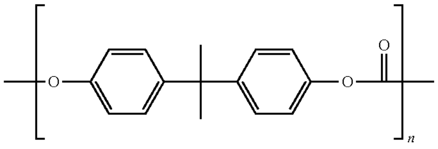

(B-2)

Those materials were dissolved in 100 parts of dichloromethane to prepare a coating liquid for a charge-transporting layer.

The coating liquid for a charge-transporting layer prepared in the foregoing was applied onto the charge-generating layer formed in the foregoing by dip coating to form a coat, and the coat was dried by heating at a temperature of 120° C. for 30 minutes to form a charge-transporting layer having a thickness of 20 μm.

Comparative Example 14

<Support>

An aluminum cylinder having a diameter of 24 mm and a length of 257 mm was used as a support (cylindrical support).

<Undercoat Layer>

100 Parts of zinc oxide particles (average primary particle diameter: 70 nm, manufactured by Tayca Corporation, specific surface area value: 15 $m^2/g$) and 500 parts of methanol were stirred and mixed, and 1.25 parts by mass of a silane coupling agent (product name: KBM-603, manufactured by Shin-Etsu Chemical Co., Ltd.) was added to the mixture, followed by stirring for 2 hours. After that, methanol was evaporated by distillation under reduced pressure, and the residue was dried for 3 hours at 120° C. Thus, zinc oxide particles whose surfaces had already been treated with the organosilicon compound were obtained.

Next, the following materials were prepared.

| | |
|---|---|
| Zinc oxide particles whose surfaces have already been treated with the organosilicon compound obtained in the foregoing | 60 parts |
| Alizarin | 0.6 part |
| Blocked isocyanate (product name: Sumidur 3173, manufactured by Sumitomo Bayer Urethane Co., Ltd.) | 13.5 parts |
| Butyral resin (product name: BM-1, manufactured by Sekisui Chemical Co., Ltd.) | 15 parts |

38 Parts of a solution obtained by dissolving those materials in 85 parts of methyl ethyl ketone and 25 parts of methyl ethyl ketone were mixed to prepare a dispersion liquid. The dispersion liquid was subjected to dispersion treatment in a vertical sand mill using glass beads each having a diameter of 1.0 mm for 4 hours, and the glass beads were removed. After that, 0.005 part of dioctyltin dilaurate serving as a catalyst and 4 parts of silicone resin particles (TOSPEARL 145, manufactured by GE Toshiba Silicone Co., Ltd.) were added to the residue to prepare a coating liquid for an undercoat layer.

The coating liquid for an undercoat layer prepared in the foregoing was applied onto the above-mentioned support by dip coating, and the resultant coat was dried for 40 minutes at 180° C. to form an undercoat layer having a thickness of 25 μm.

<Charge-Generating Layer>

The following materials were prepared.

| | |
|---|---|
| Chlorogallium phthalocyanine crystal having strong diffraction peaks at Bragg angles 2θ of at least 7.4°, 16.6°, 25.5°, and 28.3° in an X-ray diffraction spectrum using a CuKα ray, the crystal serving as a charge-generating material | 15 parts |
| Vinyl chloride-vinyl acetate copolymer resin (product name: VMCH, manufactured by Union Carbide Japan K.K.) | 10 parts |
| n-Butyl alcohol | 300 parts |

A mixture formed of those materials was subjected to dispersion treatment in a vertical sand mill using glass beads each having a diameter of 1.0 mm for 4 hours, and the glass beads were removed. Thus, a coating liquid for a charge-generating layer was prepared.

The coating liquid for a charge-generating layer prepared in the foregoing was applied onto the above-mentioned undercoat layer by dip coating to form a coat, and the coat was dried by heating at a temperature of 100° C. for 10 minutes to form a charge-generating layer having a thickness of 0.20 μm.

<Charge-Transporting Layer>

0.6 Part of tetrafluoroethylene resin particles (average particle diameter: 0.2 μm) and 0.015 part of a fluoroalkyl group-containing methacrylic copolymer (weight-average molecular weight: 30,000) were dispersed in a mixed solvent of 4 parts of tetrahydrofuran and 1 part of toluene. After that, the materials were stirred and mixed for 48 hours while the temperature of the mixed liquid was kept at 20° C. Thus, a tetrafluoroethylene resin particle suspension was obtained.

Next, the following materials were prepared.

| | |
|---|---|
| Polycarbonate having a repeating structure represented by the following formula (B-3) (viscosity-average molecular weight: about 55,000) | 6 parts |
| Compound represented by the following formula (CTM-10), the compound serving as a charge-transporting substance | 2 parts |
| 2,6-Di-t-butyl-4-methylphenol serving as an antioxidant | 0.1 part |

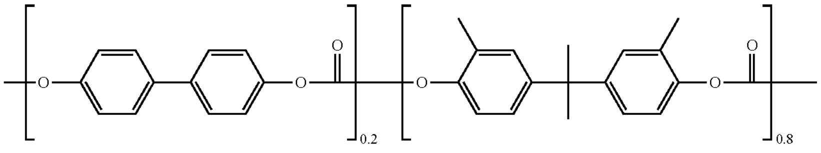

(B-3)

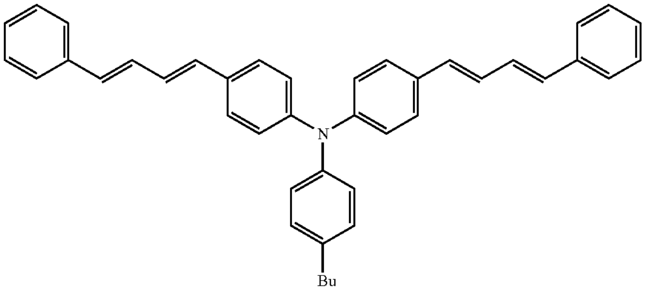

(CTM-10)

Those materials were mixed, and were dissolved in a mixed solvent of 24 parts of tetrahydrofuran and 11 parts of toluene.

The tetrafluoroethylene resin particle suspension obtained in the foregoing was added to the solution, and the materials were stirred and mixed to provide a suspension. The suspension was subjected to dispersion treatment with a high-pressure homogenizer (manufactured by Yoshida Kikai Co., Ltd.) mounted with a through-type chamber having a fine flow path while a pressure in the homogenizer was increased to 500 kgf/$cm^2$. The dispersion treatment was repeated six times. 5 Parts per million of a fluorine-modified silicone oil (product name: FL-100, manufactured by Shin-Etsu Silicone Co., Ltd.) was added to the resultant liquid, and the mixture was sufficiently stirred to provide a coating liquid for forming a charge-transporting layer.

The coating liquid for a charge-transporting layer prepared in the foregoing was applied onto the charge-generating layer formed in the foregoing by dip coating to form a coat, and the coat was dried by heating at a temperature of 135° C. for 30 minutes to form a charge-transporting layer having a thickness of 25 μm.

Comparative Example 15

<Support>

The surface of an aluminum cylinder having a diameter of 24 mm and a length of 257 mm was subjected to anodization treatment, and was then subjected to sealing treatment with a sealer containing nickel acetate as a main component so that an anodized coating film having a thickness of 7.4 μm was formed thereon. Thus, a support (cylindrical support) was obtained.

<Undercoat Layer>

5 Parts of titanium oxide particles (average primary particle diameter: 35 nm, manufactured by Tayca Corporation: MT-500SA) and 5 parts of copolymerized nylon (product name: AMILAN CM8000, manufactured by Toray Industries, Inc.) were added to a mixed solvent of 50 parts of methanol and 10 parts of n-propanol to prepare a dispersion liquid. The dispersion liquid was subjected to dispersion treatment in a vertical sand mill using glass beads each having a diameter of 1.0 mm for 5 hours, and the glass beads were removed. Thus, a coating liquid for an undercoat layer was prepared. The coating liquid for an undercoat layer prepared in the foregoing was applied onto the above-mentioned support by dip coating, and the resultant coat was dried by heating at 150° C. for 10 minutes to form an undercoat layer having a thickness of 1.2 μm.

<Charge-Generating Layer>

The coating liquid 1 for a charge-generating layer was applied onto the undercoat layer formed in the foregoing by dip coating to form a coat, and the coat was dried by heating at a temperature of 100° C. for 10 minutes to form a charge-generating layer having a thickness of 0.20 μm.

<Charge-Transporting Layer>

The following materials were prepared.

| | |
|---|---|
| 1,1-Bis(4-diethylaminophenyl)-4,4-diphenyl-1,3-butadiene serving as a charge- transporting substance | 10 parts |
| Polycarbonate (product name: PCZ-500, manufactured by Mitsubishi Gas Chemical Company Inc.) | 10 parts |
| Dibutylhydroxytoluene serving as an antioxidant | 0.1 part |

Those materials were dissolved in 100 parts of tetrahydrofuran to prepare a coating liquid for a charge-transporting layer.

The coating liquid for a charge-transporting layer prepared in the foregoing was applied onto the charge-generating layer formed in the foregoing by dip coating to form a coat, and the coat was dried by heating at a temperature of 135° C. for 30 minutes to form a charge-transporting layer having a thickness of 36 μm.

Comparative Example 16

An electrophotographic photosensitive member according to Comparative Example 16 was produced in the same manner as in Comparative Example 15 except that in Comparative Example 15, the method of forming the charge-transporting layer was changed as described below.

<Charge-Transporting Layer>

The coating liquid 4 for a charge-transporting layer was applied onto the charge-generating layer by dip coating to form a coat, and the coat was dried by heating at a temperature of 120° C. for 30 minutes to form a charge-transporting layer having a thickness of 17 μm.

Comparative Example 17

<Support>

An aluminum cylinder having a diameter of 24 mm and a length of 257 mm was used as a support (cylindrical support).

<Electroconductive Layer>

The coating liquid 2 for an electroconductive layer was applied onto the above-mentioned support by dip coating to form a coat, and the coat was cured by heating at 150° C. for 30 minutes to form an electroconductive layer having a thickness of 25 μm.

<Undercoat Layer>

The coating liquid 1 for an undercoat layer was applied onto the electroconductive layer formed in the foregoing by dip coating to form a coat, and the coat was cured by heating at 100° C. for 10 minutes to form an undercoat layer having a thickness of 1.7 μm.

<Charge-Generating Layer>

The following materials were prepared.

| | |
|---|---|
| Hydroxygallium phthalocyanine of a crystal form having diffraction peaks at Bragg angles 2θ of at least 7.5° and 28.4° in an X-ray diffraction spectrum using a CuKα ray, the phthalocyanine serving as a charge-generating material | 10 parts |
| Polyvinyl butyral resin (product name: S-LEC BX-1, manufactured by Sekisui Chemical Co., Ltd.) | 5 parts |

Those materials were added to 200 parts of cyclohexanone, and the materials were dispersed with a sand mill apparatus using glass beads each having a diameter of 0.9 mm for 6 hours. 150 Parts of cyclohexanone and 350 parts of ethyl acetate were further added to dilute the dispersion liquid. Thus, a coating liquid for a charge-generating layer was prepared.

The coating liquid for a charge-generating layer prepared in the foregoing was applied onto the undercoat layer formed in the foregoing by dip coating, and the resultant coat was dried for 10 minutes at 95° C. to form a charge-generating layer having a thickness of 0.20 μm.

<Charge-Transporting Layer>

The coating liquid 4 for a charge-transporting layer was applied onto the charge-generating layer formed in the foregoing by dip coating to form a coat, and the coat was dried by heating at a temperature of 120° C. for 30 minutes to form a charge-transporting layer having a thickness of 17 μm.

Comparative Example 18

An electrophotographic photosensitive member according to Comparative Example 18 was produced in the same manner as in Comparative Example 17 except that in Comparative Example 17, the thickness of the charge-generating layer was changed from 0.20 μm to 0.16 μm.

Comparative Example 19

An electrophotographic photosensitive member according to Comparative Example 19 was produced in the same manner as in Comparative Example 17 except that in Comparative Example 17, a protection layer was arranged on the charge-transporting layer as described below.

<Protection Layer>

The coating liquid 1 for a protection layer was applied onto the charge-transporting layer by dip coating to form a coat, and the resultant coat was dried for 4 minutes at 35° C. After that, under a nitrogen atmosphere, the coat was irradiated with electron beams for 4.8 seconds under the conditions of an acceleration voltage of 57 kV and a beam current of 5.3 mA while a distance between the support (irradiation target body) and an electron beam irradiation window was set to 25 mm, and the support (irradiation target body) was rotated at a speed of 300 rpm. The absorbed dose of the electron beams at this time was measured to be 20 kGy. After that, under the nitrogen atmosphere, the temperature of air surrounding the coat was increased from 25° C. to 137° C. over 10 seconds to perform the heating of the coat. An oxygen concentration during a time period from the electron beam irradiation to the subsequent heating treatment was 10 ppm or less. Next, in the air, the coat was naturally cooled until its temperature became 25° C., and heating treatment was performed for 10 minutes under such a condition that the temperature of the coat became 100° C. Thus, a protection layer having a thickness of 1.9 μm was formed.

Comparative Example 20

An electrophotographic photosensitive member according to Comparative Example 20 was produced in the same manner as in Comparative Example 17 except that in Comparative Example 17, the method of forming the charge-transporting layer was changed as described below.

<Charge-Transporting Layer>

The coating liquid 2 for a charge-transporting layer was applied onto the charge-generating layer by dip coating to form a coat, and the coat was dried by heating at a temperature of 120° C. for 30 minutes to form a charge-transporting layer having a thickness of 17 μm.

Comparative Example 21

An electrophotographic photosensitive member according to Comparative Example 21 was produced in the same manner as in Comparative Example 17 except that in Comparative Example 17, the method of forming the charge-transporting layer was changed as described below.

<Charge-Transporting Layer>

The coating liquid 3 for a charge-transporting layer was applied onto the charge-generating layer by dip coating to form a coat, and the coat was dried by heating at a temperature of 120° C. for 30 minutes to form a charge-transporting layer having a thickness of 17 μm.

Comparative Example 22

An electrophotographic photosensitive member of Comparative Example 22 was produced in the same manner as in Comparative Example 21 except that in Comparative Example 21, a protection layer was arranged on the charge-transporting layer as described below.

<Protection Layer>

The coating liquid 1 for a protection layer was applied onto the charge-transporting layer by dip coating to form a coat, and the resultant coat was dried for 4 minutes at 35° C. After that, under a nitrogen atmosphere, the coat was irradiated with electron beams for 4.8 seconds under the conditions of an acceleration voltage of 57 kV and a beam current of 5.3 mA while a distance between the support (irradiation target body) and an electron beam irradiation window was set to 25 mm, and the support (irradiation target body) was rotated at a speed of 300 rpm. The absorbed dose of the electron beams at this time was measured to be 20 kGy. After that, under the nitrogen atmosphere, the temperature of air surrounding the coat was increased from 25° C. to 137° C. over 10 seconds to perform the heating of the coat. An oxygen concentration during a time period from the electron beam irradiation to the subsequent heating treatment was 10 ppm or less. Next, in the air, the coat was naturally cooled until its temperature became 25° C., and heating treatment was performed for 10 minutes under such a condition that the temperature of the coat became 100° C. Thus, a protection layer having a thickness of 1.9 μm was formed.

TABLE 1

| Example | Electroconductive layer | | Undercoat layer | | Charge-generating layer | | Charge-transporting layer | | Protection layer | |
|---|---|---|---|---|---|---|---|---|---|---|
| | Coating liquid No. | Thickness (μm) | Coating liquid No. | Thickness (μm) | Coating liquid No. | Thickness (μm) | Coating liquid No. | Thickness (μm) | Coating liquid No. | Thickness (μm) |
| Example 1 | 1 | 25 | 1 | 1.7 | 1 | 0.20 | 1 | 15 | 1 | 1.9 |
| Example 2 | 1 | 25 | 1 | 1.7 | 1 | 0.20 | 1 | 12 | 1 | 1.9 |
| Example 3 | 1 | 25 | 1 | 1.7 | 1 | 0.16 | 1 | 17 | — | — |
| Example 4 | 1 | 25 | 1 | 1.7 | 1 | 0.18 | 1 | 17 | — | — |
| Example 5 | 1 | 25 | 1 | 1.7 | 1 | 0.20 | 1 | 17 | — | — |
| Example 6 | 1 | 25 | 1 | 1.7 | 1 | 0.22 | 1 | 17 | — | — |
| Example 7 | 1 | 25 | 1 | 1.7 | 1 | 0.30 | 1 | 17 | — | — |
| Example 8 | 1 | 25 | 1 | 1.7 | 1 | 0.36 | 1 | 17 | — | — |
| Example 9 | 1 | 25 | 1 | 1.7 | 1 | 0.20 | 2 | 14 | — | — |
| Example 10 | 1 | 25 | 1 | 1.7 | 1 | 0.20 | 2 | 17 | — | — |
| Example 11 | 1 | 25 | 1 | 1.7 | 1 | 0.20 | 2 | 24 | — | — |
| Example 12 | 1 | 25 | 1 | 1.7 | 1 | 0.20 | 3 | 17 | — | — |
| Example 13 | 1 | 25 | 1 | 1.7 | 1 | 0.20 | 4 | 14 | — | — |
| Example 14 | 2 | 25 | 1 | 1.7 | 1 | 0.16 | 1 | 17 | — | — |
| Example 15 | 2 | 25 | 1 | 1.7 | 1 | 0.20 | 1 | 17 | — | — |
| Example 16 | 2 | 25 | 1 | 1.7 | 1 | 0.36 | 1 | 17 | — | — |
| Example 17 | 1 | 25 | 1 | 1.7 | 1 | 0.20 | 1 | 12 | — | — |
| Example 18 | 1 | 25 | 1 | 1.7 | 1 | 0.20 | 1 | 14 | — | — |
| Example 19 | 1 | 25 | 1 | 1.7 | 1 | 0.20 | 1 | 15 | — | — |
| Example 20 | 1 | 25 | 1 | 1.7 | 1 | 0.20 | 1 | 19 | — | — |
| Example 21 | 1 | 25 | 1 | 1.7 | 1 | 0.20 | 1 | 22 | — | — |
| Example 22 | 1 | 25 | 1 | 1.7 | 1 | 0.20 | 1 | 24 | — | — |
| Example 23 | 1 | 25 | 1 | 1.7 | 1 | 0.20 | 1 | 25 | — | — |
| Example 24 | 1 | 25 | 1 | 1.7 | 1 | 0.20 | 1 | 27 | — | — |
| Example 25 | 1 | 25 | 1 | 1.7 | 1 | 0.20 | 5 | 25 | — | — |
| Example 26 | 1 | 25 | 1 | 1.7 | 1 | 0.20 | 6 | 14 | — | — |
| Example 27 | 1 | 25 | 1 | 1.7 | 1 | 0.20 | 6 | 17 | — | — |
| Example 28 | 1 | 25 | 1 | 1.7 | 1 | 0.20 | 6 | 19 | — | — |
| Example 29 | 1 | 25 | 1 | 1.7 | 1 | 0.20 | 6 | 22 | — | — |
| Example 30 | 1 | 25 | 1 | 1.7 | 1 | 0.20 | 6 | 25 | — | — |
| Example 31 | 1 | 25 | 1 | 1.7 | 1 | 0.20 | 6 | 27 | — | — |
| Example 32 | 1 | 25 | 1 | 1.7 | 1 | 0.20 | 6 | 29 | — | — |
| Example 33 | 1 | 25 | 1 | 1.7 | 1 | 0.20 | 7 | 27 | — | — |
| Example 34 | 1 | 25 | 1 | 1.7 | 1 | 0.20 | 7 | 29 | — | — |
| Example 35 | 1 | 25 | 2 | 1.7 | 1 | 0.20 | 1 | 17 | — | — |
| Example 36 | 1 | 25 | 3 | 1.7 | 1 | 0.20 | 1 | 17 | — | — |
| Example 37 | 1 | 25 | 4 | 1.7 | 1 | 0.20 | 1 | 17 | — | — |
| Example 38 | 1 | 25 | 5 | 1.7 | 1 | 0.20 | 1 | 17 | — | — |
| Example 39 | 1 | 25 | 6 | 1.7 | 1 | 0.20 | 1 | 17 | — | — |
| Example 40 | 1 | 25 | 7 | 1.7 | 1 | 0.20 | 1 | 17 | — | — |
| Example 41 | 1 | 25 | 8 | 1.7 | 1 | 0.20 | 1 | 17 | — | — |
| Example 42 | 1 | 25 | 9 | 1.7 | 1 | 0.20 | 1 | 17 | — | — |
| Example 43 | — | — | 1 | 2.6 | 1 | 0.16 | 1 | 17 | — | — |
| Example 44 | — | — | 1 | 2.6 | 1 | 0.20 | 1 | 17 | — | — |
| Example 45 | — | — | 1 | 2.6 | 1 | 0.36 | 1 | 17 | — | — |
| Example 46 | — | — | 1 | 2.6 | 1 | 0.20 | 2 | 14 | — | — |
| Example 47 | — | — | 1 | 2.6 | 1 | 0.20 | 2 | 17 | — | — |
| Example 48 | — | — | 1 | 2.6 | 1 | 0.20 | 4 | 12 | — | — |
| Example 49 | — | — | 1 | 2.6 | 1 | 0.20 | 4 | 17 | — | — |
| Example 50 | — | — | 1 | 2.6 | 1 | 0.20 | 4 | 27 | — | — |
| Example 51 | 1 | 25 | 1 | 1.7 | 2 | 0.12 | 1 | 17 | — | — |
| Example 52 | 1 | 25 | 1 | 1.7 | 2 | 0.15 | 1 | 17 | — | — |
| Example 53 | 1 | 25 | 1 | 1.7 | 2 | 0.17 | 1 | 17 | — | — |
| Example 54 | 1 | 25 | 1 | 1.7 | 2 | 0.20 | 1 | 17 | — | — |
| Example 55 | 1 | 25 | 1 | 1.7 | 2 | 0.23 | 1 | 17 | — | — |
| Example 56 | 1 | 25 | 1 | 1.7 | 2 | 0.26 | 1 | 17 | — | — |
| Example 57 | 1 | 25 | 1 | 1.7 | 2 | 0.20 | 2 | 17 | — | — |
| Example 58 | 1 | 25 | 1 | 1.7 | 2 | 0.20 | 4 | 17 | — | — |

TABLE 1-continued

| Example | Electroconductive layer Coating liquid No. | Electroconductive layer Thickness (μm) | Undercoat layer Coating liquid No. | Undercoat layer Thickness (μm) | Charge-generating layer Coating liquid No. | Charge-generating layer Thickness (μm) | Charge-transporting layer Coating liquid No. | Charge-transporting layer Thickness (μm) | Protection layer Coating liquid No. | Protection layer Thickness (μm) |
|---|---|---|---|---|---|---|---|---|---|---|
| Example 59 | — | — | 1 | 1.7 | 2 | 0.20 | 1 | 15 | — | — |
| Example 60 | — | — | 1 | 1.7 | 2 | 0.20 | 1 | 17 | — | — |
| Example 61 | 1 | 25 | 1 | 1.7 | 2 | 0.20 | 1 | 15 | 1 | 1.9 |
| Example 62 | 1 | 25 | 1 | 1.7 | 2 | 0.20 | 1 | 12 | 1 | 1.9 |

TABLE 2

| Comparative Example | Electroconductive layer Coating liquid No. | Electroconductive layer Thickness (μm) | Undercoat layer Coating liquid No. | Undercoat layer Thickness (μm) | Charge-generating layer Coating liquid No. | Charge-generating layer Thickness (μm) | Charge-transporting layer Coating liquid No. | Charge-transporting layer Thickness (μm) | Protection layer Coating liquid No. | Protection layer Thickness (μm) |
|---|---|---|---|---|---|---|---|---|---|---|
| Comparative Example 1 | — | — | 10 | 1.3 | 1 | 0.16 | 8 | 17 | — | — |
| Comparative Example 2 | — | — | 10 | 1.3 | 1 | 0.20 | 8 | 17 | — | — |
| Comparative Example 3 | — | — | 10 | 1.3 | 1 | 0.36 | 8 | 17 | — | — |
| Comparative Example 4 | — | — | 11 | 2.0 | 1 | 0.16 | 8 | 17 | — | — |
| Comparative Example 5 | — | — | 11 | 2.0 | 1 | 0.20 | 8 | 17 | — | — |
| Comparative Example 6 | — | — | 11 | 2.0 | 1 | 0.36 | 8 | 17 | — | — |
| Comparative Example 7 | — | — | 11 | 2.0 | 1 | 0.20 | 10 | 17 | — | — |
| Comparative Example 8 | — | — | 11 | 2.0 | 1 | 0.20 | 8 | 23 | — | — |
| Comparative Example 9 | — | — | 11 | 2.0 | 1 | 0.20 | 9 | 17 | — | — |
| Comparative Example 10 | — | — | 11 | 2.0 | 1 | 0.27 | 9 | 17 | — | — |

[Evaluation of Electrophotographic Photosensitive Member]

The electrophotographic photosensitive members according to Examples and Comparative Examples described above were subjected to the following evaluations. The results are shown in Table 3 and Table 4.

The term "Thickness of layer having charge-transporting ability" in each of Table 3 and Table 4 has the following meanings: when the protection layer is a layer having a charge-transporting ability, the term means the thickness of a laminated layer of the charge-transporting layer and the protection layer; and when the protection layer is a layer free of any charge-transporting ability, the term means the thickness of the charge-transporting layer.

<Evaluation of $S_0$, $S_1$, $S_2$, $S_3$, $S_4$, and $|\Delta V_r|$>

A photosensitive member tester (product name: CYNTHIA 59, manufactured by Gen-Tech, Inc.) was used in the evaluation of the $S_0$, $S_1$, $S_2$, $S_3$, $S_4$, and $|\Delta V_r|$ of each of the photosensitive members. The evaluation was performed after each of the photosensitive members according to Examples and Comparative Examples had been left to stand in the photosensitive member tester having established therein an environment having a temperature of 15° C. and a relative humidity of 45% RH, or a temperature of 45° C. and a relative humidity of 16% RH for 24 hours or more. In addition, an electroconductive rubber roller having a diameter of 8 mm was used as a charging member.

In the measurement of the potential of each of the electrophotographic photosensitive members, a surface potential probe (model 6000B-8: manufactured by Trek Japan K.K.) was placed at a position distant from the electrophotographic photosensitive member by 1 mm, and a surface potentiometer (model 344: manufactured by Trek Japan K.K.) was used.

Under the foregoing conditions, the $S_0$, the $S_1$, the $S_2$, the $S_3$, the $S_4$, and the $|\Delta V_r|$ were calculated in accordance with the above-mentioned procedure, and the value of a ratio $S_1/S_0$, whether each of the $S_2$, the $S_3$, and the $S_4$ was positive or negative, and the value of the $|\Delta V_r|$ were evaluated.

<Fluctuation in Tinge of Image>

A reconstructed machine of a laser beam printer (product name: HP Color LaserJet Enterprise M652, manufactured by Hewlett-Packard Company) was used as an electrophotographic apparatus for an evaluation. The printer was reconstructed in terms of the following points: the regulation of a voltage to be applied to the charging roller of the printer and the regulation of the image exposure light amount thereof were enabled; and the printing speed thereof was set to 100 sheets/min.

First, the electrophotographic apparatus and each of the photosensitive members were left to stand in an environment having a temperature of 15° C. and a relative humidity of 45% RH for 24 hours or more, and then the photosensitive member was mounted on the cartridge of the electrophotographic apparatus.

As the evaluation of a fluctuation in tinge of an image in repeated use, an image of a test chart having a print percentage of 1% was continuously output on 2,000 sheets (corresponding to 4,000 sheets in double-sided printing) of A4-size plain paper in a double-sided printing mode. After the start of the image output, the relative humidity of the environment in which the electrophotographic apparatus and the photosensitive member were placed was increased from 45% RH to 80% RH in 10 minutes at a rate of 10% RH.

As a condition for the charging of the photosensitive member, the voltage to be applied to the charging roller was regulated so that the initial dark potential of the photosensitive member became −500 V, and as an exposure condition, the amount of light to which the photosensitive member was exposed was adjusted so that the initial light potential thereof became −140 V.

The surface potential of the photosensitive member was measured by reconstructing the cartridge and mounting a potential probe (product name: model 6000B-8, manufactured by Trek Japan K.K.) on the developing position of the cartridge. The potential was measured with a surface potentiometer (product name: model 344, manufactured by Trek Japan K.K.).

At each of time points before the above-mentioned repeated use and immediately after the repeated use, a halftone image was output on 1 sheet. The densities of the respective images were measured with a spectral densitometer (product name: X-Rite 504/508, manufactured by X-Rite Inc.), and the absolute value of a change in tinge between the output images was calculated. When the absolute value was 0.15 or less, it was judged that the effect of the present invention was obtained.

TABLE 3

| Example No. | Thickness of layer having charge-transporting ability (μm) | Degree of hydrophobicity α (%) | $\lvert\Delta Vr\rvert$ (V) | $S_1/S_0$ | $S_2$ | $S_3$ | $S_4$ | Fluctuation in tinge of image |
|---|---|---|---|---|---|---|---|---|
| Example 1 | 17 | 30 | 20.8 | 0.274 | Positive | Negative | Positive | 0.09 |
| Example 2 | 14 | 30 | 19.3 | 0.256 | Positive | Negative | Positive | 0.03 |
| Example 3 | 17 | 30 | 10.4 | 0.174 | Positive | Negative | Positive | 0.05 |
| Example 4 | 17 | 30 | 16.5 | 0.231 | Positive | Negative | Positive | 0.06 |
| Example 5 | 17 | 30 | 14.3 | 0.218 | Positive | Negative | Positive | 0.04 |
| Example 6 | 17 | 30 | 13.6 | 0.221 | Positive | Negative | Positive | 0.03 |
| Example 7 | 17 | 30 | 12.6 | 0.197 | Positive | Negative | Positive | 0.05 |
| Example 8 | 17 | 30 | 18.7 | 0.242 | Positive | Negative | Positive | 0.03 |
| Example 9 | 14 | 30 | 17.3 | 0.262 | Positive | Negative | Positive | 0.03 |
| Example 10 | 17 | 30 | 19.3 | 0.288 | Positive | Negative | Positive | 0.08 |
| Example 11 | 24 | 30 | 24.2 | 0.324 | Positive | Negative | Positive | 0.14 |
| Example 12 | 17 | 30 | 18.1 | 0.315 | Positive | Negative | Positive | 0.08 |
| Example 13 | 14 | 30 | 10.5 | 0.192 | Positive | Negative | Positive | 0.05 |
| Example 14 | 17 | 30 | 14.2 | 0.181 | Positive | Negative | Positive | 0.03 |
| Example 15 | 17 | 30 | 13.3 | 0.178 | Positive | Negative | Positive | 0.02 |
| Example 16 | 17 | 30 | 17.4 | 0.232 | Positive | Negative | Positive | 0.05 |
| Example 17 | 12 | 30 | 11.5 | 0.185 | Positive | Negative | Positive | 0.04 |
| Example 18 | 14 | 30 | 12.8 | 0.215 | Positive | Negative | Positive | 0.05 |
| Example 19 | 15 | 30 | 13.2 | 0.241 | Positive | Negative | Positive | 0.05 |
| Example 20 | 19 | 30 | 16.7 | 0.239 | Positive | Negative | Positive | 0.09 |
| Example 21 | 22 | 30 | 20 | 0.254 | Positive | Negative | Positive | 0.10 |
| Example 22 | 24 | 30 | 21.5 | 0.261 | Positive | Negative | Positive | 0.07 |
| Example 23 | 25 | 30 | 23.7 | 0.274 | Positive | Negative | Positive | 0.09 |
| Example 24 | 27 | 30 | 27.1 | 0.326 | Positive | Negative | Positive | 0.14 |
| Example 25 | 25 | 30 | 21.3 | 0.255 | Positive | Negative | Positive | 0.08 |
| Example 26 | 14 | 30 | 11.3 | 0.173 | Positive | Negative | Positive | 0.05 |
| Example 27 | 17 | 30 | 12.8 | 0.199 | Positive | Negative | Positive | 0.05 |
| Example 28 | 19 | 30 | 15.5 | 0.194 | Positive | Negative | Positive | 0.09 |
| Example 29 | 22 | 30 | 18.4 | 0.222 | Positive | Negative | Positive | 0.09 |
| Example 30 | 25 | 30 | 19.5 | 0.238 | Positive | Negative | Positive | 0.09 |
| Example 31 | 27 | 30 | 24.8 | 0.241 | Positive | Negative | Positive | 0.11 |
| Example 32 | 29 | 30 | 25.6 | 0.306 | Positive | Negative | Positive | 0.14 |
| Example 33 | 27 | 30 | 18.4 | 0.264 | Positive | Negative | Positive | 0.11 |
| Example 34 | 29 | 30 | 24.5 | 0.259 | Positive | Negative | Positive | 0.10 |
| Example 35 | 17 | 7 | 18.2 | 0.274 | Positive | Negative | Positive | 0.10 |
| Example 36 | 17 | 10 | 17.5 | 0.257 | Positive | Negative | Positive | 0.03 |
| Example 37 | 17 | 17 | 15.7 | 0.219 | Positive | Negative | Positive | 0.06 |
| Example 38 | 17 | 45 | 14.4 | 0.221 | Positive | Negative | Positive | 0.03 |
| Example 39 | 17 | 66 | 15.1 | 0.241 | Positive | Negative | Positive | 0.06 |
| Example 40 | 17 | 70 | 17.4 | 0.253 | Positive | Negative | Positive | 0.03 |
| Example 41 | 17 | 73 | 19.3 | 0.272 | Positive | Negative | Positive | 0.10 |
| Example 42 | 17 | 80 | 22.6 | 0.313 | Positive | Negative | Positive | 0.13 |
| Example 43 | 17 | 30 | 9.9 | 0.175 | Positive | Negative | Positive | 0.03 |
| Example 44 | 17 | 30 | 11.9 | 0.183 | Positive | Negative | Positive | 0.04 |
| Example 45 | 17 | 30 | 15.6 | 0.185 | Positive | Negative | Positive | 0.04 |
| Example 46 | 14 | 30 | 15.6 | 0.248 | Positive | Negative | Positive | 0.04 |
| Example 47 | 17 | 30 | 18.5 | 0.282 | Positive | Negative | Positive | 0.09 |
| Example 48 | 12 | 30 | 11.2 | 0.152 | Positive | Negative | Positive | 0.04 |
| Example 49 | 17 | 30 | 13.1 | 0.179 | Positive | Negative | Positive | 0.04 |
| Example 50 | 27 | 30 | 27.8 | 0.331 | Positive | Negative | Positive | 0.15 |
| Example 51 | 17 | 30 | 13.2 | 0.267 | Positive | Negative | Positive | 0.06 |
| Example 52 | 17 | 30 | 16.7 | 0.275 | Positive | Negative | Positive | 0.06 |
| Example 53 | 17 | 30 | 11.5 | 0.254 | Positive | Negative | Positive | 0.02 |
| Example 54 | 17 | 30 | 8.9 | 0.227 | Positive | Negative | Positive | 0.05 |

TABLE 3-continued

| Example No. | Thickness of layer having charge-transporting ability (μm) | Degree of hydrophobicity α (%) | \|ΔVr\| (V) | $S_1/S_0$ | $S_2$ | $S_3$ | $S_4$ | Fluctuation in tinge of image |
|---|---|---|---|---|---|---|---|---|
| Example 55 | 17 | 30 | 10.4 | 0.254 | Positive | Negative | Positive | 0.05 |
| Example 56 | 17 | 30 | 9.4 | 0.242 | Positive | Negative | Positive | 0.03 |
| Example 57 | 17 | 30 | 16.8 | 0.263 | Positive | Negative | Positive | 0.06 |
| Example 58 | 17 | 30 | 12.2 | 0.245 | Positive | Negative | Positive | 0.04 |
| Example 59 | 15 | 30 | 8.9 | 0.158 | Positive | Negative | Positive | 0.05 |
| Example 60 | 17 | 30 | 9.3 | 0.168 | Positive | Negative | Positive | 0.05 |
| Example 61 | 17 | 30 | 18.4 | 0.261 | Positive | Negative | Positive | 0.02 |
| Example 62 | 14 | 30 | 16.6 | 0.248 | Positive | Negative | Positive | 0.03 |

TABLE 4

| Comparative Example No. | Thickness of layer having charge-transporting ability (μm) | Degree of hydrophobicity α (%) | \|ΔVr\| (V) | $S_1/S_0$ | $S_2$ | $S_3$ | $S_4$ | Fluctuation in tinge of image |
|---|---|---|---|---|---|---|---|---|
| Comparative Example 1 | 17 | 23 | 33.4 | 0.854 | Positive | Negative | Positive | 0.25 |
| Comparative Example 2 | 17 | 23 | 31.1 | 0.812 | Positive | Negative | Positive | 0.18 |
| Comparative Example 3 | 17 | 23 | 32.2 | 0.805 | Positive | Negative | Positive | 0.22 |
| Comparative Example 4 | 17 | — | 47.2 | 0.917 | Positive | Negative | Positive | 0.19 |
| Comparative Example 5 | 17 | — | 42.2 | 0.885 | Positive | Negative | Positive | 0.21 |
| Comparative Example 6 | 17 | — | 41.5 | 0.907 | Positive | Negative | Positive | 0.21 |
| Comparative Example 7 | 17 | — | 35.6 | 0.713 | Positive | Negative | Positive | 0.19 |
| Comparative Example 8 | 23 | — | 48.4 | 0.932 | Positive | Negative | Positive | 0.22 |
| Comparative Example 9 | 17 | — | 34.1 | 0.615 | Positive | Negative | Positive | 0.26 |
| Comparative Example 10 | 17 | — | 36.9 | 0.633 | Positive | Negative | Positive | 0.28 |
| Comparative Example 11 | 18 | — | 32.8 | 0.821 | Positive | Negative | Positive | 0.23 |
| Comparative Example 12 | 24 | — | 13.5 | 0.479 | Positive | Negative | Positive | 0.27 |
| Comparative Example 13 | 20 | 72 | 39 | 0.551 | Positive | Negative | Positive | 0.24 |
| Comparative Example 14 | 25 | — | 45.7 | 0.843 | Positive | Negative | Positive | 0.24 |
| Comparative Example 15 | 36 | — | 29.9 | 0.433 | Positive | Positive | Positive | 0.32 |
| Comparative Example 16 | 17 | — | 17.1 | 0.311 | Positive | Positive | Positive | 0.26 |
| Comparative Example 17 | 17 | 30 | 13.6 | 0.136 | Positive | Positive | Positive | 0.19 |
| Comparative Example 18 | 17 | 30 | 12 | 0.113 | Positive | Positive | Positive | 0.25 |
| Comparative Example 19 | 19 | 30 | 15.7 | 0.135 | Positive | Positive | Positive | 0.23 |
| Comparative Example 20 | 17 | 30 | 17.2 | 0.182 | Positive | Positive | Positive | 0.20 |
| Comparative Example 21 | 17 | 30 | 16.4 | 0.174 | Positive | Positive | Positive | 0.24 |
| Comparative Example 22 | 19 | 30 | 20.7 | 0.212 | Positive | Positive | Positive | 0.25 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-130208, filed Aug. 6, 2021, which is hereby incorporated by reference herein in its entirety.

What is claimed is:

1. An electrophotographic photosensitive member comprising in this order:

a support;

an undercoat layer comprising titanium oxide particles whose surfaces are treated with an organosilicon compound, which exhibit a degree of hydrophobicity of 10 to 70%;

a charge-generating layer; and a charge-transporting layer, wherein with regard to an $S_0$, an $S_1$, an $S_2$, an $S_3$, and an $S_4$ determined by the following procedure (A), a ratio $S_1/S_0$ is 0.34 or less, and one of the $S_2$, the $S_3$, or the $S_4$ is a positive value, and another two thereof are negative values, or two thereof are positive values, and another one thereof is a negative value:

procedure (A)

A1. a temperature of 15° C. is represented by $T_1$ [° C.] and a relative humidity of 45% RH is represented by $\Phi_1$ [% RH], and a $V_{exp}$ [V] corresponding to each $I_{exp}$ [μJ/cm$^2$] is obtained at the temperature $T_1$ [° C.] and the relative humidity $\Phi_1$ [% RH] by the following procedure (B);

procedure (B)

the following B1 to B5 are performed while the electrophotographic photosensitive member is rotated at a rotational speed of 60 rpm:

B1. a surface potential is set to 0;

B2. a voltage is applied to a surface of the electrophotographic photosensitive member so that an absolute value of the surface potential becomes 500 V;

B3. exposure is performed with light having a wavelength of 655 nm and a light amunt $I_{exp}$ [μJ/cm$^{2]}$ $^{0.125}$ second after completion of the voltage application;

B4. the absolute value of the surface potential obtained through measurement 0.250 second after the completion of the voltage application is represented by $V_{exp}$ [V]; and B5. while the $I_{exp}$ is changed from 0.000 μJ/cm$^2$ to 1.000 μJ/cm$^2$ at intervals of 0.001 μJ/cm$^2$, the B1 to the B4 are repeatedly performed to provide the $V_{exp}$ [V] corresponding to each $I_{exp}$ [μJ/cm$^2$];

A2. a temperature of 45° C. is represented by $T_2$ [° C.] and a relative humidity of 16% RH is represented by $\Phi_2$ [% RH], and the $V_{exp}$ [V] corresponding to each $I_{exp}$ [μJ/cm$^2$] is obtained at the temperature $T_2$ [° C.] and the relative humidity $\Phi_2$ [% RH] by the procedure (B);

A3. the $V_{exp}$ [V] obtained in the A1 is plotted to produce a graph whose axis of ordinate and axis of abscissa indicate the $V_{exp}$ [V] and the $I_{exp}$, respectively, and a slope "k" in a range of the $I_{exp}$ of from 0.000 to 0.030 μJ/cm$^2$ is determined, followed by determination of quantum efficiency $\eta_0$ ($T_1$, $\Phi_1$) from the following equation (1):

$$k = \frac{ed\eta_0}{\varepsilon_0\varepsilon_r hv} \quad (1)$$

in the equation (1), "e" represents an elementary charge, "d" represents a thickness of a photosensitive layer, $\eta_0$ represents quantum efficiency, $\varepsilon_0$ represents a dielectric constant of vacuum, $\varepsilon_r$ represents a relative dielectric constant of the charge-transporting layer, "h" represents the Planck constant, and v represents a frequency of the applied light;

A4. a recombination constant $P_e$ ($T_1$, $\Phi_1$) and a residual voltage $V_r$ ($T_1$, $\Phi_1$) at the temperature $T_1$ [° C.] and the relative humidity $\Phi_1$ [% RH] are determined by subjecting the graph produced in the A3 to fitting through use of the following equation (2) where the value of the quantum efficiency no determined in the A3 is used at a time of the fitting, thereby a relationship between the $V_{exp}$ [V] ($T_1$, $\Phi_1$) and the $I_{exp}$ [μJ/cm$^2$] under conditions of the temperature $T_1$ [° C.] and the relative humidity $\Phi_1$ [% RH], a relationship according to the following equation (2), is obtained:

$$\frac{V_{exp} - V_r}{V_d - V_r} = \left[1 - (1 - P_e)\frac{ed\eta_0 I_{exp}}{\varepsilon_0\varepsilon_r hv(V_d - V_r)}\right]^{1/(1-P_e)} \quad (2)$$

in the equation (2), $V_r$ represents residual voltage, $V_d$ represents the absolute value of the surface potential before the exposure, $P_e$ represents a recombination constant, "e" represents the elementary charge, "d" represents the thickness of the photosensitive layer, $\eta_0$ represents the quantum efficiency, $\varepsilon_0$ represents the dielectric constant of vacuum, $\varepsilon_r$ represents the relative dielectric constant of the charge-transporting layer, "h" represents the Planck constant, and v represents the frequency of the applied light;

A5. quantum efficiency $\eta_0$ ($T_2$, $\Phi_2$), a recombination constant $P_e$ ($T_2$, $\Phi_2$), and a residual voltage $V_r$ ($T_2$, $\Phi_2$) at the temperature $T_2$ [° C.] and the relative humidity $\Phi_2$ [% RH] are determined for the $V_{exp}$ [V] obtained in the A2 in the same manner as in the A3 and the A4, thereby a relationship between the $V_{exp}$ [V] ($T_2$, $\Phi_2$) and the $I_{exp}$ [μJ/cm$^2$] under conditions of the temperature $T_2$ [° C.] and the relative humidity $\Phi_2$ [% RH], the relationship according to the equation (2), is obtained;

A6. a value obtained by subtracting the $V_{exp}$ [V] ($T_2$, $\Phi_2$) from the $V_{exp}$ [V] ($T_1$, $\Phi_1$) is represented by $\Delta V_{exp}$ [V];

A7. with regard to the $V_{exp}$ [V] obtained in the A1, the light amount when $V_{exp}$ [V]=250 V is represented by $I_{1/2}$ [μJ/cm$^2$], and the $V_{exp}$ [V] when $I_{exp}$ [μJ/cm$^2$]=3.414·$I_{1/2}$ [μJ/cm$^2$] is represented by $V_R$ [V], and at this time, an integrated value of a $|\Delta V_{exp}|$ [V] when the $V_{exp}$ [V] ($T_1$, $\Phi_1$) falls within a range of from the $V_R$ [V] to 500 V in a relationship between the $|\Delta V_{exp}|$ [V] and the $V_{exp}$ [V] ($T_1$, $\Phi_1$) is represented by $S_0$;

A8. a relationship between the $I_{exp}$ [μJ/cm$^2$] and the $V_{exp}$ [V] is obtained by using the equation (2) with the values of the quantum efficiency $\eta_0$ ($T_1$, Φ1), the recombination constant $P_e$ ($T_1$, $\Phi_1$), and the residual voltage $V_r$ ($T_2$, $\Phi_2$);

A9. a value obtained by subtracting the $V_{exp}$ [V] obtained in the A8 from the $V_{exp}$ [V] ($T_1$, $\Phi_1$) is represented by $\Delta V_a$ [V];

A10. an integrated value of a $|\Delta V_a|$ [V] when the $V_{exp}$ [V] ($T_1$, $\Phi_1$) falls within the range of from the $V_R$ [V] to 500

V in a relationship between the $|\Delta V_a|$ [V] and the $V_{exp}$ [V] ($T_1$, $\Phi_1$) is represented by $S_1$, and an integrated value of the $\Delta V_a$ [V] when the $V_{exp}$ [V] ($T_1$, $\Phi_1$) falls within the range of from the $V_R$ [V] to 500 V in a relationship between the $\Delta V_a$ [V] and the $V_{exp}$ [V] ($T_1$, $\Phi_1$) is represented by $S_2$;

A11. the relationship between the $I_{exp}$ [μJ/cm$^2$] and the $V_{exp}$ [V] is obtained by using the equation (2) with the values of the quantum efficiency $\eta_0$ ($T_2$, $\Phi_2$), the recombination constant $P_e$ ($T_1$, $\Phi_1$), and the residual voltage $V_r$ ($T_1$, $\Phi_1$);

A12. a value obtained by subtracting the $V_{exp}$ [V] obtained in the A11 from the $V_{exp}$ [V] ($T_1$, $\Phi_1$) is represented by $\Delta V_b$ [V];

A13. an integrated value of the $\Delta V_b$ [V] when the $V_{exp}$ [V] ($T_1$, $\Phi_1$) falls within the range of from the $V_R$ [V] to 500 V in a relationship between the $\Delta V_b$ [V] and the $V_{exp}$ [V] ($T_1$, $\Phi_1$) is represented by $S_3$;

A14. the relationship between the $I_{exp}$ [μJ/cm$^2$] and the $V_{exp}$ [V] is obtained by using the equation (2) with the values of the quantum efficiency $\eta_0$ ($T_1$, $\Phi_1$), the recombination constant $P_e$ ($T_2$, $\Phi_2$), and the residual voltage $V_r$ ($T_1$, $\Phi_1$);

A15. a value obtained by subtracting the $V_{exp}$ [V] obtained in the A14 from the $V_{exp}$ [V] ($T_1$, $\Phi_1$) is represented by $\Delta V_c$ [V]; and A16. an integrated value of the $\Delta V_c$ [V] when the $V_{exp}$ [V] ($T_1$, $\Phi_1$) falls within the range of from the $V_R$ [V] to 500 V in a relationship between the $\Delta V_c$ [V] and the $V_{exp}$ [V] ($T_1$, $\Phi_1$) is represented by $S_4$.

2. The electrophotographic photosensitive member according to claim 1, wherein $S_1/S_0$ is 0.28 or less.

3. The electrophotographic photosensitive member according to claim 1, wherein $|\Delta V_r|$ [V] is 20 V or less, when $|\Delta V_r|$ [V] is an absolute value of a difference between the residual voltage $V_r$ ($T_1$, $\Phi_1$) and the residual voltage $V_r$ ($T_2$, $\Phi_2$).

4. The electrophotographic photosensitive member according to claim 1, wherein the charge-transporting layer has a thickness of 17 μm or less.

5. A process cartridge, comprising:

an electrophotographic photosensitive member; and at least one member selected from the group consisting of: a charging unit; a developing unit; and a cleaning unit, the process cartridge integrally supporting the electrophotographic photosensitive member and the at least one member, and being removably mounted onto a main body of an electrophotographic apparatus, the electrophotographic photosensitive member comprising in this order:

a support;

an undercoat layer comprising titanium oxide particles whose surfaces are treated with an organosilicon compound, which exhibit a degree of hydrophobicity of 10 to 70%;

a charge-generating layer; and a charge-transporting layer, wherein with regard to an $S_0$, an $S_1$, an $S_2$, an $S_3$, and an $S_4$ determined by the following procedure (A), a ratio $S_1/S_0$ is 0.34 or less, and one of the $S_2$, the $S_3$, or the $S_4$ is a positive value, and another two thereof are negative values, or two thereof are positive values, and another one thereof is a negative value:

procedure (A)

A1. a temperature of 15° C. is represented by $T_1$ [° C.] and a relative humidity of 45% RH is represented by $\Phi_1$ [% RH], and a $V_{exp}$ [V] corresponding to each $I_{exp}$ [μJ/cm$^2$] is obtained at the temperature $T_1$ [° C.] and the relative humidity $\Phi_1$ [% RH] by the following procedure (B);

procedure (B)

the following B1 to B5 are performed while the electrophotographic photosensitive member is rotated at a rotational speed of 60 rpm:

B1. a surface potential is set to 0;

B2. a voltage is applied to a surface of the electrophotographic photosensitive member so that an absolute value of the surface potential becomes 500 V;

B3. exposure is performed with light having a wavelength of 655 nm and a light amount $I_{exp}$ [μJ/cm$^2$] 0.125 second after completion of the voltage application;

B4. the absolute value of the surface potential obtained through measurement 0.250 second after the completion of the voltage application is represented by $V_{exp}$ [V]; and B5. while the $I_{exp}$ is changed from 0.000 μJ/cm$^2$ to 1.000 μJ/cm$^2$ at intervals of 0.001 μJ/cm$^2$, the B1 to the B4 are repeatedly performed to provide the $V_{exp}$ [V] corresponding to each $I_{exp}$ [μJ/cm$^2$];

A2. a temperature of 45° C. is represented by $T_2$ [° C.] and a relative humidity of 16% RH is represented by $\Phi_2$ [% RH], and the $V_{exp}$ [V] corresponding to each $I_{exp}$ [μJ/cm$^2$] is obtained at the temperature $T_2$ [° C.] and the relative humidity $\Phi_2$ [% RH] by the procedure (B);

A3. the $V_{exp}$ [V] obtained in the A1 is plotted to produce a graph whose axis of ordinate and axis of abscissa indicate the $V_{exp}$ [V] and the $I_{exp}$, respectively, and a slope "k" in a range of the $I_{exp}$ of from 0.000 to 0.030 μJ/cm$^2$ is determined, followed by determination of quantum efficiency $\eta_0$ ($T_1$, $\Phi_1$) from the following equation (1):

$$k = \frac{ed\eta_0}{\varepsilon_0 \varepsilon_r h\nu} \quad (1)$$

in the equation (1), "e" represents an elementary charge, "d" represents a thickness of a photosensitive layer, $\eta_0$ represents quantum efficiency, $\varepsilon_0$ represents a dielectric constant of vacuum, $\varepsilon_r$ represents a relative dielectric constant of the charge-transporting layer, "h" represents the Planck constant, and v represents a frequency of the applied light;

A4. a recombination constant $P_e$ ($T_1$, $\Phi_1$) and a residual voltage $V_r$ ($T_1$, $\Phi_1$) at the temperature $T_1$ [° C.] and the relative humidity $\Phi_1$ [% RH] are determined by subjecting the graph produced in the A3 to fitting through use of the following equation (2) where the value of the quantum efficiency no determined in the A3 is used at a time of the fitting, thereby a relationship between the $V_{exp}$ [V] ($T_1$, $\Phi_1$) and the $I_{exp}$ [μJ/cm$^2$] under conditions of the temperature $T_1$ [° C.] and the relative humidity $\Phi_1$ [% RH], a relationship according to the following equation (2), is obtained:

$$\frac{V_{exp} - V_r}{V_d - V_r} = \left[1 - (1 - P_e)\frac{ed\eta_0 I_{exp}}{\varepsilon_0 \varepsilon_r h\nu(V_d - V_r)}\right]^{1/(1-P_e)} \quad (2)$$

in the equation (2), $V_r$ represents residual voltage, $V_d$ represents the absolute value of the surface potential before the exposure, $P_e$ represents a recombination constant, "e" represents the elementary charge, "d"

represents the thickness of the photosensitive layer, $\eta_0$ represents the quantum efficiency, $\varepsilon_0$ represents the dielectric constant of vacuum, $\varepsilon_r$ represents the relative dielectric constant of the charge-transporting layer, "h" represents the Planck constant, and v represents the frequency of the applied light;

A5. quantum efficiency $\eta_0$ ($T_2$, $\Phi_2$), a recombination constant $P_e$ ($T_2$, $\Phi_2$), and a residual voltage $V_r$ ($T_2$, $\Phi_2$) at the temperature $T_2$ [° C.] and the relative humidity $\Phi_2$ [% RH] are determined for the $V_{exp}$ [V] obtained in the A2 in the same manner as in the A3 and the A4, thereby a relationship between the $V_{exp}$ [V] ($T_2$, $\Phi_2$) and the $I_{exp}$ [μJ/cm$^2$] under conditions of the temperature $T_2$ [° C.] and the relative humidity $\Phi_2$ [% RH], the relationship according to the equation (2), is obtained;

A6. a value obtained by subtracting the $V_{exp}$ [V] ($T_2$, $\Phi_2$) from the $V_{exp}$ [V] ($T_1$, $\Phi_1$) is represented by $\Delta V_{exp}$ [V];

A7. with regard to the $V_{exp}$ [V] obtained in the A1, the light amount when $V_{exp}$ [V]=250 V is represented by $I_{1/2}$ [μJ/cm$^2$], and the $V_{exp}$ [V] when $I_{exp}$ [μJ/cm$^2$]= $3.414 \cdot I_{1/2}$ [μJ/cm$^2$] is represented by $V_R$ [V], and at this time, an integrated value of a $|\Delta V_{exp}|$ [V] when the $V_{exp}$ [V] ($T_1$, $\Phi_1$) falls within a range of from the $V_R$ [V] to 500 V in a relationship between the $|\Delta V_{exp}|$ [V] and the $V_{exp}$ [V] ($T_1$, $\Phi_1$) is represented by $S_0$;

A8. a relationship between the $I_{exp}$ [μJ/cm$^2$] and the $V_{exp}$ [V] is obtained by using the equation (2) with the values of the quantum efficiency $\eta_0$ ($T_1$, Φ1), the recombination constant $P_e$ ($T_1$, $\Phi_1$), and the residual voltage $V_r$ ($T_2$, $\Phi_2$);

A9. a value obtained by subtracting the $V_{exp}$ [V] obtained in the A8 from the $V_{exp}$ [V] ($T_1$, $\Phi_1$) is represented by $\Delta V_a$ [V];

A10. an integrated value of a $|\Delta V_a|$ [V] when the $V_{exp}$ [V] ($T_1$, $\Phi_1$) falls within the range of from the $V_R$ [V] to 500 V in a relationship between the $|\Delta V_a|$ [V] and the $V_{exp}$ [V] ($T_1$, $\Phi_1$) is represented by $S_1$, and an integrated value of the $\Delta V_a$ [V] when the $V_{exp}$ [V] ($T_1$, $\Phi_1$) falls within the range of from the $V_R$ [V] to 500 V in a relationship between the $\Delta V_a$ [V] and the $V_{exp}$ [V] ($T_1$, $\Phi_1$) is represented by $S_2$;

A11. the relationship between the $I_{exp}$ [μJ/cm$^2$] and the $V_{exp}$ [V] is obtained by using the equation (2) with the values of the quantum efficiency $\eta_0$ ($T_2$, $\Phi_2$), the recombination constant $P_e$ ($T_1$, $\Phi_1$), and the residual voltage $V_r$ ($T_1$, $\Phi_1$);

A12. a value obtained by subtracting the $V_{exp}$ [V] obtained in the A11 from the $V_{exp}$ [V] ($T_1$, $\Phi_1$) is represented by $\Delta V_b$ [V];

A13. an integrated value of the $\Delta V_b$ [V] when the $V_{exp}$ [V] ($T_1$, $\Phi_1$) falls within the range of from the $V_R$ [V] to 500 V in a relationship between the $\Delta V_b$ [V] and the $V_{exp}$ [V] ($T_1$, $\Phi_1$) is represented by $S_3$;

A14. the relationship between the $I_{exp}$ [μJ/cm$^2$] and the $V_{exp}$ [V] is obtained by using the equation (2) with the values of the quantum efficiency $\eta_0$ ($T_1$, $\Phi_1$), the recombination constant $P_e$ ($T_2$, $\Phi_2$), and the residual voltage $V_r$ ($T_1$, $\Phi_1$);

A15. a value obtained by subtracting the $V_{exp}$ [V] obtained in the A14 from the $V_{exp}$ [V] ($T_1$, $\Phi_1$) is represented by $\Delta V_c$ [V]; and A16. an integrated value of the $\Delta V_c$ [V] when the $V_{exp}$ [V] ($T_1$, $\Phi_1$) falls within the range of from the $V_R$ [V] to 500 V in a relationship between the $\Delta V_c$ [V] and the $V_{exp}$ [V] ($T_1$, $\Phi_1$) is represented by $S_4$.

6. An electrophotographic apparatus, comprising:

an electrophotographic photosensitive member;

a charging unit;

an exposing unit;

a developing unit; and a transferring unit, the electrophotographic photosensitive member comprising in this order:

a support;

an undercoat layer comprising titanium oxide particles whose surfaces are treated with an organosilicon compound, which exhibit a degree of hydrophobicity of 10 to 70%;

a charge-generating layer; and a charge-transporting layer, wherein with regard to an $S_0$, an $S_1$, an $S_2$, an $S_3$, and an $S_4$ determined by the following procedure (A), a ratio $S_1/S_0$ is 0.34 or less, and one of the $S_2$, the $S_3$, or the $S_4$ is a positive value, and another two thereof are negative values, or two thereof are positive values, and another one thereof is a negative value:

procedure (A)

A1. a temperature of 15° C. is represented by $T_1$ [° C.] and a relative humidity of 45% RH is represented by $\Phi_1$ [% RH], and a $V_{exp}$ [V] corresponding to each $I_{exp}$ [μJ/cm$^2$] is obtained at the temperature $T_1$ [° C.] and the relative humidity $\Phi_1$ [% RH] by the following procedure (B);

procedure (B)

the following B1 to B5 are performed while the electrophotographic photosensitive member is rotated at a rotational speed of 60 rpm:

B1. a surface potential is set to 0;

B2. a voltage is applied to a surface of the electrophotographic photosensitive member so that an absolute value of the surface potential becomes 500 V;

B3. exposure is performed with light having a wavelength of 655 nm and a light amount $I_{exp}$ [μJ/cm$^2$] 0.125 second after completion of the voltage application;

B4. the absolute value of the surface potential obtained through measurement 0.250 second after the completion of the voltage application is represented by $V_{exp}$ [V]; and B5. while the $I_{exp}$ is changed from 0.000 μJ/cm$^2$ to 1.000 μJ/cm$^2$ at intervals of 0.001 μJ/cm$^2$, the B1 to the B4 are repeatedly performed to provide the $V_{exp}$ [V] corresponding to each $I_{exp}$ [μJ/cm$^2$];

A2. a temperature of 45° C. is represented by $T_2$ [° C.] and a relative humidity of 16% RH is represented by $\Phi_2$ [% RH], and the $V_{exp}$ [V] corresponding to each $I_{exp}$ [μJ/cm$^2$] is obtained at the temperature $T_2$ [° C.] and the relative humidity $\Phi_2$ [% RH] by the procedure (B);

A3. the $V_{exp}$ [V] obtained in the A1 is plotted to produce a graph whose axis of ordinate and axis of abscissa indicate the $V_{exp}$ [V] and the $I_{exp}$, respectively, and a slope "k" in a range of the $I_{exp}$ of from 0.000 to 0.030 μJ/cm$^2$ is determined, followed by determination of quantum efficiency $\eta_0$ ($T_1$, $\Phi_1$) from the following equation (1):

$$k = \frac{ed\eta_0}{\varepsilon_0 \varepsilon_r h\nu} \tag{1}$$

in the equation (1), "e" represents an elementary charge, "d" represents a thickness of a photosensitive layer, $\eta_0$ represents quantum efficiency, $\varepsilon_0$ represents a dielectric constant of vacuum, $\varepsilon_r$ represents a relative dielectric constant of the charge-transporting layer, "h" represents the Planck constant, and v represents a frequency of the applied light;

A4. a recombination constant $P_e$ ($T_1$, $\Phi_1$) and a residual voltage $V_r$ ($T_1$, $\Phi_1$) at the temperature $T_1$ [° C.] and the relative humidity $\Phi_1$ [% RH] are determined by subjecting the graph produced in the A3 to fitting through use of the following equation (2) where the value of the quantum efficiency no determined in the A3 is used at a time of the fitting, thereby a relationship between the $V_{exp}$ [V] ($T_1$, $\Phi_1$) and the $I_{exp}$ [μJ/cm$^2$] under conditions of the temperature $T_1$ [° C.] and the relative humidity $\Phi_1$ [% RH], a relationship according to the following equation (2), is obtained:

$$\frac{V_{exp} - V_r}{V_d - V_r} = \left[1 - (1 - P_e)\frac{ed\eta_0 I_{exp}}{\varepsilon_0 \varepsilon_r h\nu(V_d - V_r)}\right]^{1/(1-P_e)} \quad (2)$$

in the equation (2), $V_r$ represents residual voltage, $V_d$ represents the absolute value of the surface potential before the exposure, $P_e$ represents a recombination constant, "e" represents the elementary charge, "d" represents the thickness of the photosensitive layer, $\eta_0$ represents the quantum efficiency, $\varepsilon_0$ represents the dielectric constant of vacuum, $\varepsilon_r$ represents the relative dielectric constant of the charge-transporting layer, "h" represents the Planck constant, and v represents the frequency of the applied light;

A5. quantum efficiency $\eta_0$ ($T_2$, $\Phi_2$), a recombination constant $P_e$ ($T_2$, $\Phi_2$), and a residual voltage $V_r$ ($T_2$, $\Phi_2$) at the temperature $T_2$ [° C.] and the relative humidity $\Phi_2$ [% RH] are determined for the $V_{exp}$ [V] obtained in the A2 in the same manner as in the A3 and the A4, thereby a relationship between the $V_{exp}$ [V] ($T_2$, $\Phi_2$) and the $I_{exp}$ [μJ/cm$^2$] under conditions of the temperature $T_2$ [° C.] and the relative humidity $\Phi_2$ [% RH], the relationship according to the equation (2), is obtained;

A6. a value obtained by subtracting the $V_{exp}$ [V] ($T_2$, $\Phi_2$) from the $V_{exp}$ [V] ($T_1$, $\Phi_1$) is represented by $\Delta V_{exp}$ [V];

A7. with regard to the $V_{exp}$ [V] obtained in the A1, the light amount when $V_{exp}$ [V]=250 V is represented by $I_{1/2}$ [μJ/cm$^2$], and the $V_{exp}$ [V] when $I_{exp}$ [μJ/cm$^2$]= $3.414 \cdot I_{1/2}$ [μJ/cm$^2$] is represented by $V_R$ [V], and at this time, an integrated value of a $|\Delta V_{exp}|$ [V] when the $V_{exp}$ [V] ($T_1$, $\Phi_1$) falls within a range of from the $V_R$ [V] to 500 V in a relationship between the $|\Delta V_{exp}|$ [V] and the $V_{exp}$ [V] ($T_1$, $\Phi_1$) is represented by $S_0$;

A8. a relationship between the $I_{exp}$ [μJ/cm$^2$] and the $V_{exp}$ [V] is obtained by using the equation (2) with the values of the quantum efficiency $\eta_0$ ($T_1$, Φ1), the recombination constant $P_e$ ($T_1$, $\Phi_1$), and the residual voltage $V_r$ ($T_2$, $\Phi_2$);

A9. a value obtained by subtracting the $V_{exp}$ [V] obtained in the A8 from the $V_{exp}$ [V] ($T_1$, $\Phi_1$) is represented by $\Delta V_a$ [V];

A10. an integrated value of a $|\Delta V_a|$ [V] when the $V_{exp}$ [V] ($T_1$, $\Phi_1$) falls within the range of from the $V_R$ [V] to 500 V in a relationship between the $|\Delta V_a|$ [V] and the $V_{exp}$ [V] ($T_1$, $\Phi_1$) is represented by $S_1$, and an integrated value of the $\Delta V_a$ [V] when the $V_{exp}$ [V] ($T_1$, $\Phi_1$) falls within the range of from the $V_R$ [V] to 500 V in a relationship between the $\Delta V_a$ [V] and the $V_{exp}$ [V] ($T_1$, $\Phi_1$) is represented by $S_2$;

A11. the relationship between the $I_{exp}$ [μJ/cm$^2$] and the $V_{exp}$ [V] is obtained by using the equation (2) with the values of the quantum efficiency $\eta_0$ ($T_2$, $\Phi_2$), the recombination constant $P_e$ ($T_1$, $\Phi_1$), and the residual voltage $V_r$ ($T_1$, $\Phi_1$);

A12. a value obtained by subtracting the $V_{exp}$ [V] obtained in the A11 from the $V_{exp}$ [V] ($T_1$, $\Phi_1$) is represented by $\Delta V_b$ [V];

A13. an integrated value of the $\Delta V_b$ [V] when the $V_{exp}$ [V] ($T_1$, $\Phi_1$) falls within the range of from the $V_R$ [V] to 500 V in a relationship between the $\Delta V_b$ [V] and the $V_{exp}$ [V] ($T_1$, $\Phi_1$) is represented by $S_3$;

A14. the relationship between the $I_{exp}$ [μJ/cm$^2$] and the $V_{exp}$ [V] is obtained by using the equation (2) with the values of the quantum efficiency $\eta_0$ ($T_1$, $\Phi_1$), the recombination constant $P_e$ ($T_2$, $\Phi_2$), and the residual voltage $V_r$ ($T_1$, $\Phi_1$);

A15. a value obtained by subtracting the $V_{exp}$ [V] obtained in the A14 from the $V_{exp}$ [V] ($T_1$, $\Phi_1$) is represented by $\Delta V_c$ [V]; and A16. an integrated value of the $\Delta V_c$ [V] when the $V_{exp}$ [V] ($T_1$, $\Phi_1$) falls within the range of from the $V_R$ [V] to 500 V in a relationship between the $\Delta V_c$ [V] and the $V_{exp}$ [V] ($T_1$, $\Phi_1$) is represented by $S_4$.

7. The electrophotographic photosensitive member according to claim 1, wherein the charge-transporting layer contains a triarylamine compound represented by formula (CTM-1) and a triarylamine compound represented by formula (CTM-2) as a charge-transporting substance (CTM-1)

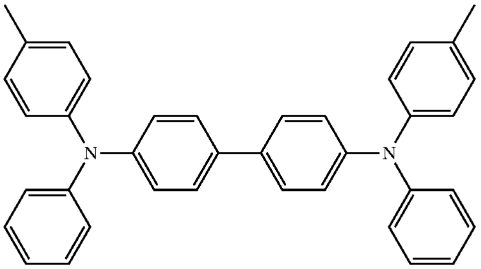

and (CTM-2)

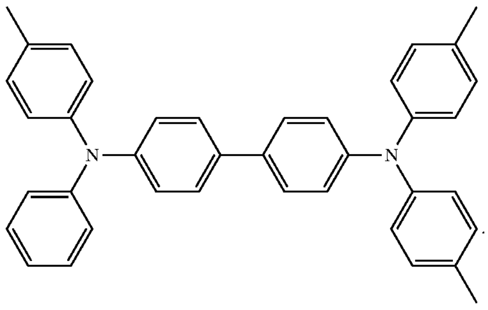

* * * * *